Sept. 17, 1940.  F. H. NICHOLSON ET AL  2,215,357
MULTIPLE UNIT PROPULSION AND BRAKING CONTROL APPARATUS
Filed April 28, 1939  4 Sheets-Sheet 2
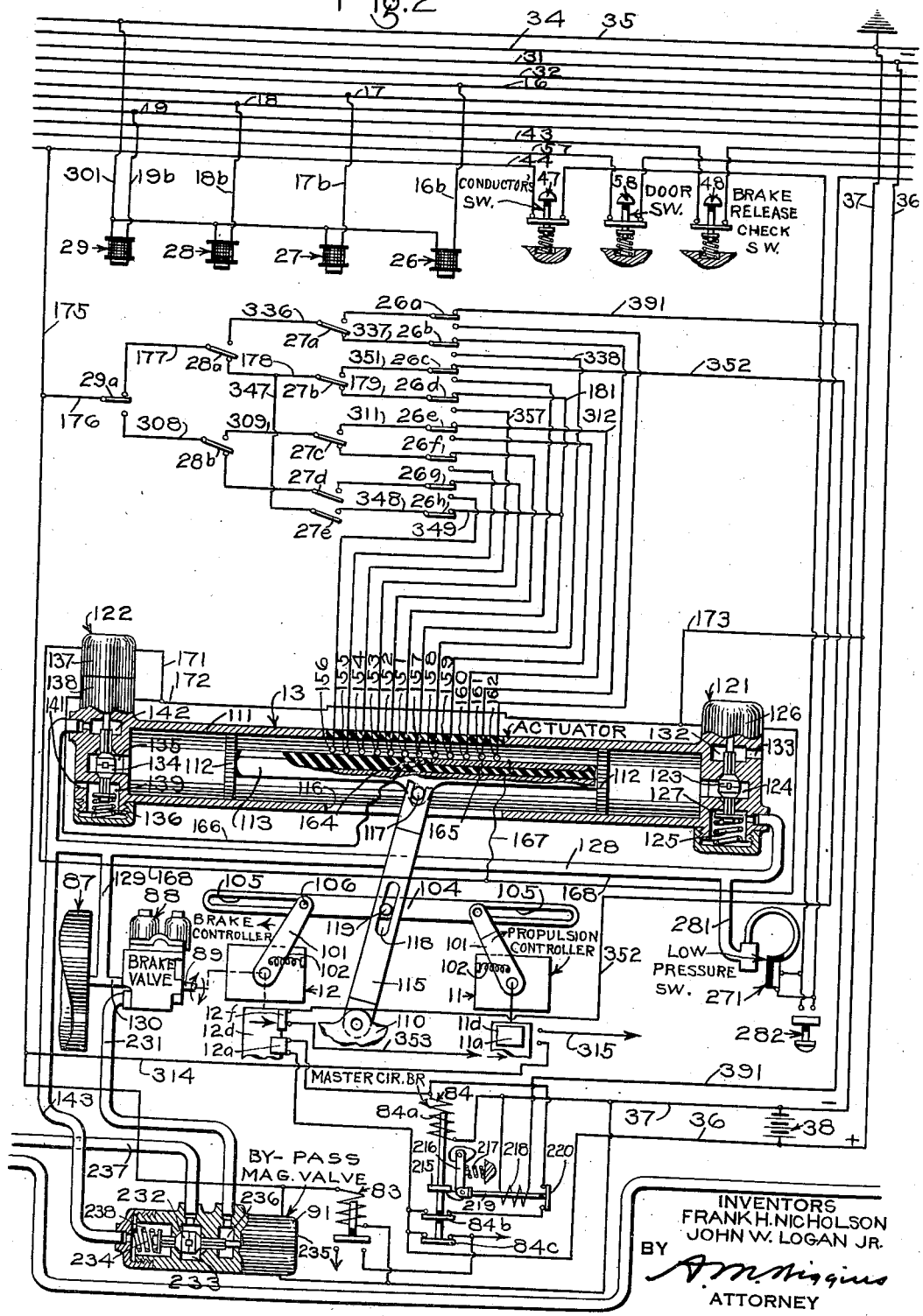
INVENTORS
FRANK H. NICHOLSON
JOHN W. LOGAN JR.
BY
A. M. Higgins
ATTORNEY

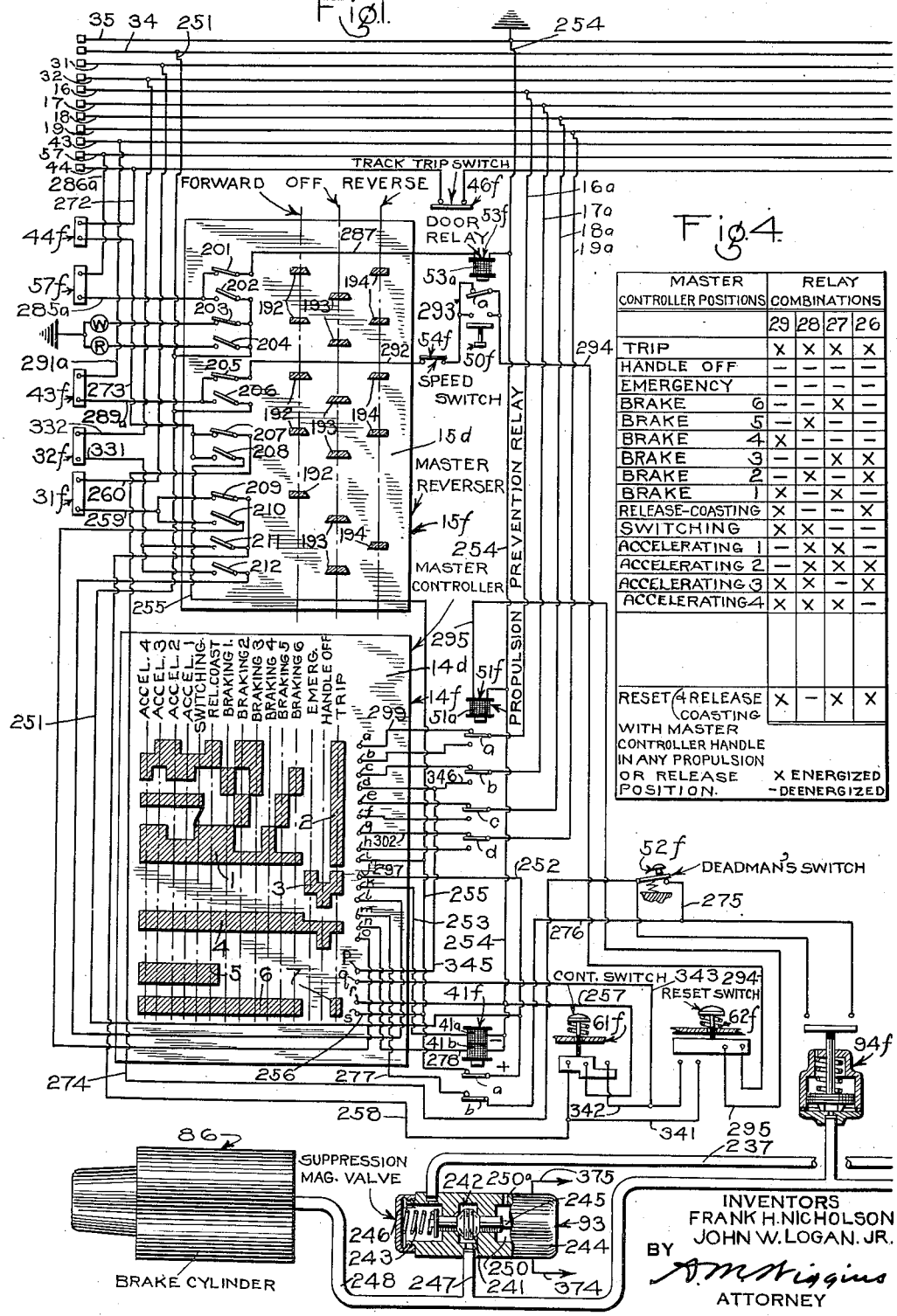

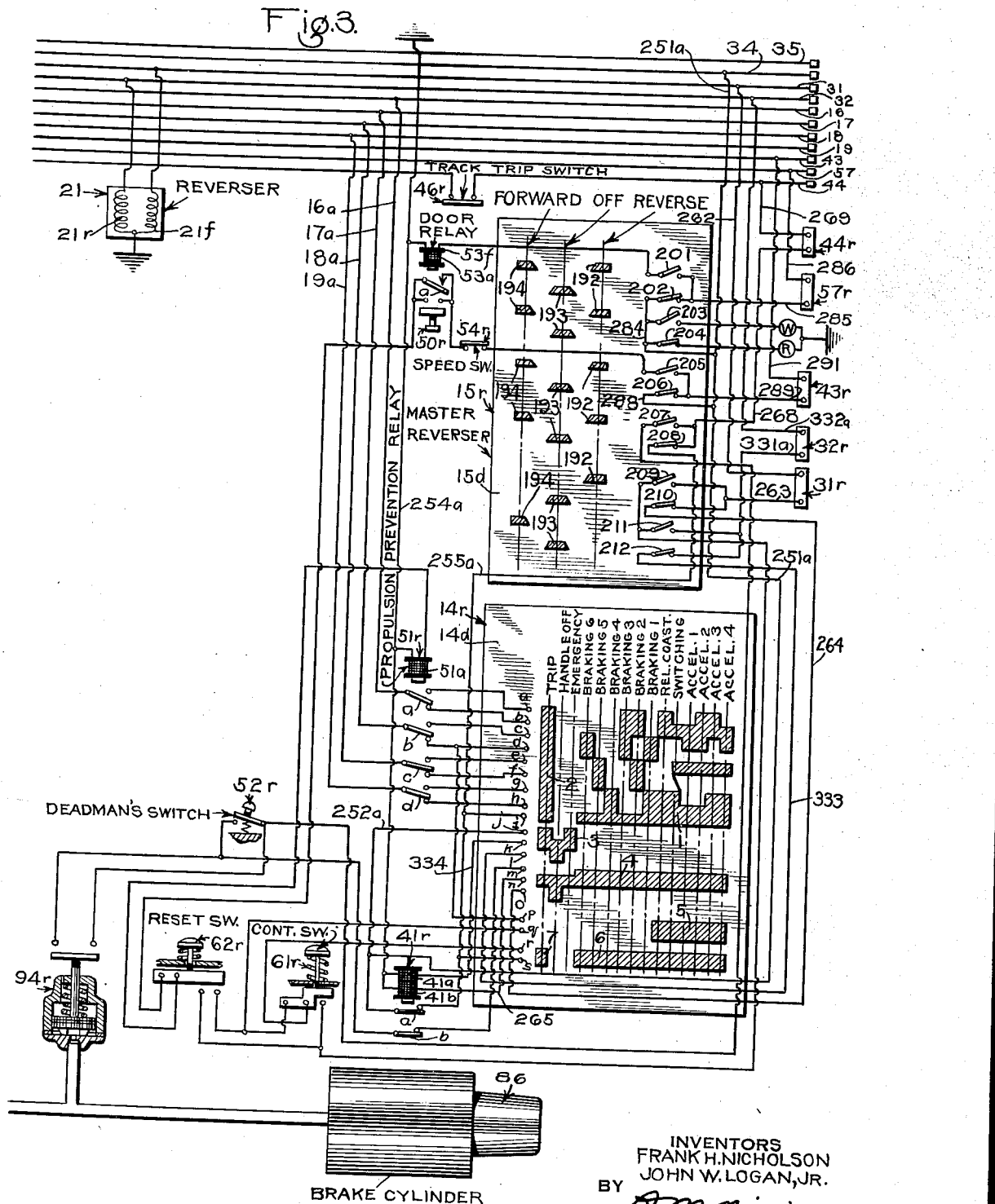

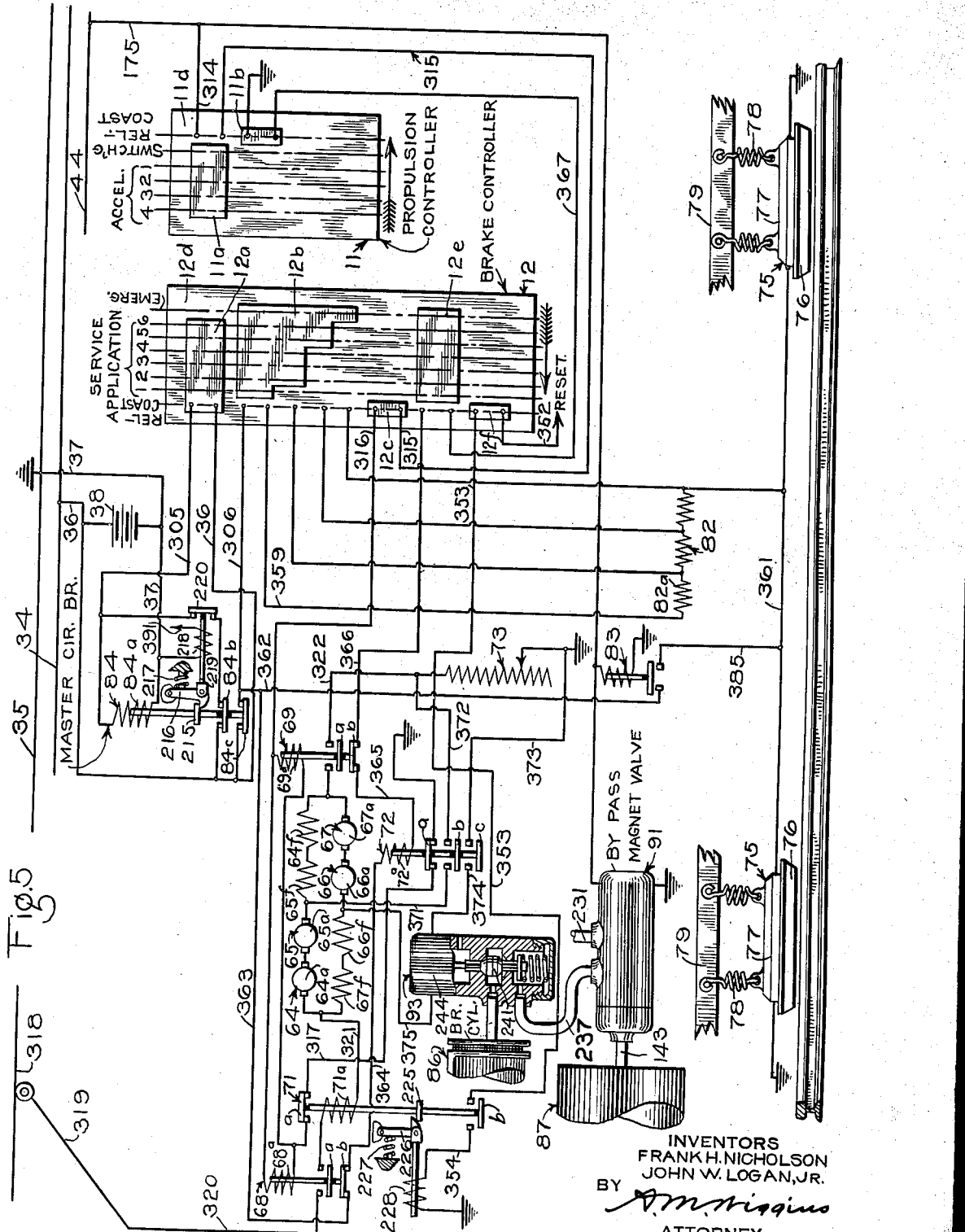

Patented Sept. 17, 1940

2,215,357

UNITED STATES PATENT OFFICE 2,215,357

MULTIPLE UNIT PROPULSION AND BRAKING CONTROL APPARATUS

Frank H. Nicholson, Penn Township, Allegheny County, and John W. Logan, Jr., Forest Hills, Pa., assignors to The Westinghouse Air Brake Company, Wilmerding, Pa., a corporation of Pennsylvania Application April 28, 1939, Serial No. 270,480

44 Claims. (Cl. 192—2)

This invention relates to propulsion and braking control apparatus for multiple unit vehicles, such as multiple unit railway trains operating in elevated or subway service, and has particular relation to a system of control whereby the control of the propulsion and braking means on the several units or cars may be effected by means of a single operator-controlled means located on one unit.

In our present invention, one or more electric driving or propulsion motors for the car wheels on each unit or cars are under the control of a drum type controller on the corresponding unit, and the brakes on each unit including magnetic track brakes, fluid pressure operated brakes associated with the vehicle wheels, and the car motors functioning as dynamic brakes are under the control of drum type controller on the corresponding unit, the propulsion controller and the brake controller being selectively operated by an electropneumatically controlled actuator to desired propulsion or brake control positions.

It is essential that the propulsion controllers and the brake controllers on all the different cars be synchronously moved and correspondingly positioned at all times to prevent undue loading of the car motors during propulsion and undesirable shock and jar to the cars, particularly in the case of cars joined in conventional manner by couplers, where violent slack action may take place due to different degrees of braking or different rates of acceleration of the different cars.

It is accordingly an object of our invention to provide an actuator on each car for operating the propulsion and brake controllers on the corresponding car so that all the controllers may be moved synchronously and also be accurately and uniformly positioned on each car under the control of an operator on one of the cars.

Another object of our invention is to provide a propulsion and braking control apparatus for a multiple unit vehicle which requires only a relatively few train wires for performing a relatively large number of control functions.

Another object of our invention is to provide a control system for the actuators on the different cars of a train whereby, with a relatively low number of train wires, a relatively large number of positions of the actuators on the several cars may be secured.

Another object of our invention is to provide a combined propulsion and braking control system for a multiple unit vehicle including means for preventing the supply of power to the propulsion means of the vehicle unless a certain train wire, extending through all the cars from one end of the train to the other, is intact and electrical connections between the sections of the train wires on the several cars correctly and properly established.

Another object of our invention is to provide a combined propulsion and braking control system in which means is provided for preventing the supply of power to the propulsion means and the consequent starting of the vehicle in the event that the brake devices associated with the car wheels should be stuck in application position.

Another object of our invention is to provide a combined propulsion and braking control system in which novel means is provided for preventing the supply of power to the propulsion means to start and propel the vehicle unless all doors on all units of cars of the train are closed, together with means for suppressing or rendering ineffective such preventing means.

Another object of our invention is to provide a combined propulsion and braking control system for a vehicle including a "deadman" device adapted to effect an emergency application of the brakes.

Another object of our invention is to provide a combined propulsion and braking control system including manually operable means on each of the cars for effecting application of the brakes on all of the cars at any time.

Another object of our invention is to provide a combined propulsion and braking control system including means for preventing interference between the propulsion and the braking systems.

The above objects, and other objects which will be made apparent hereinafter, are obtained by an illustrative embodiment of our invention subsequently to be described and shown in the accompanying drawings, wherein—

Figs. 1, 2 and 3 taken together show in diagrammatic form a combined propulsion and brake control equipment of the double-end type for a single unit of a multiple unit vehicle.

Fig. 4 is a chart which will be referred to in the subsequent description of our invention and which assists in an understanding of the operation of the equipment, and Fig. 5 is a fragmental control diagram illustrating in further detail but in simplified form the electrical connections of the propulsion and braking controllers shown in Fig. 2 to indicate in a manner not practicable in Fig. 2, the manner in which they control the propulsion and braking means.

DESCRIPTION OF EQUIPMENT

Before proceeding to a description of our invention it should be understood that the equipment shown in Figs. 1, 2 and 3, taken together, is that for a single unit or car and that on other units or cars of a multiple unit vehicle or train merely duplicates that shown.

It should also be understood that the equipment shown is a double-end equipment and accordingly that parts located at the control stations at opposite ends of each unit or car are duplicated. In the description of the equipment, the parts which are duplicated at the control stations at opposite ends of each unit will be identified by the same reference numerals except that the parts at the front end of the unit will have the suffix "f" and those at the rear end will have the suffix "r." In describing the equipment, therefore, various parts and mechanisms located at the front end control station of a car or train will be described and it will be understood that corresponding parts or elements are provided at the rear control station of the car or train, without specific description or reference thereto.

Referring to Fig. 2, the equipment shown comprises a drum type controller, hereinafter referred to as the propulsion controller 11, which controls the propulsion motors of the unit or car, and a similar drum type controller, hereinafter referred to as the brake controller 12, which controls the establishment of the connections for causing the propulsion motors to act as dynamic brakes, the magnetic track brakes and the fluid pressure operated brakes of the particular unit of car on which they are located.

The propulsion controller 11 and the brake controller 12 are operated by the same actuator 13 under the control of a master controller 14f located at the front end control station or a master controller 14r located at the rear end control station.

The control of the actuator 13 by the master controllers 14f or 14r is effected through the medium of a plurality of train wires 16, 17, 18 and 19 and a plurality of electrical relays, illustrated as four in number and hereinafter referred to as selector relays, namely 26, 27, 28 and 29 operating respectively on the train wires in the order mentioned.

For the purpose of controlling the direction of travel of the car or train there is provided, at front and rear end control stations, a master reverser 15f and 15r respectively. For purposes of simplification, the conventional reversing control mechanism for the car motors is indicated in simplified form at 21, the reversing mechanism being shown diagrammatically as comprising a pair of operating solenoids or coils 21f and 21r. The solenoid 21f is effective when energized to establish electrical connection in manner well known to cause rotation of the car motors in one direction in response to the supply or power current thereto and the solenoid 21r is effective when energized to establish suitable electrical connections for causing the car motors to rotate in the opposite direction upon the supply of power current thereto.

The reverser coils or solenoids 21f and 21r are connected respectively to and operate on a pair of so-called reverser train wires 31 and 32 respectively which are adapted to be energized selectively, one at a time, under the control of the master reversers at front or rear control stations.

In addition to the train wires previously mentioned, each car or unit is further provided with a pair of train wires 34 and 35 which are constantly connected, as by branch wires 36 and 37 respectively, to a suitable source of electric current, indicated as a storage battery 38 (Fig. 2) which may have a suitable terminal voltage, such as 32 or 64 volts. The train wires 34 and 35 will hereinafter be referred to as the positive battery wire and the negative battery wire, respectively. The negative battery wire 35 is suitably grounded at one or more points along the length thereof to the frame of the vehicle or car so as to enable a return circuit to the negative terminal of the battery 38 through a ground connection when desired. It will be understood that a suitable charging generator, not shown, may be provided for maintaining the storage battery 38 properly charged.

A pair of so-called emergency relays 41f and 41r are provided for each car and located respectively at front and rear control stations of the car, these relays being associatively connected and interlocked by circuits including one or the other of the reverser wires 31 and 32 and another train wire 44 extending from end to end of the car. This circuit arrangement is such that interruption of either one of the two wires causes drop-out of both relays 41f and 41r. The reason for this will be made more apparent hereinafter but may here be briefly stated as for the purpose of insuring an automatic emergency application of the brakes on all sections of a train that accidentally parts during motion.

The wire 44, hereinafter referred to as the emergency wire, is effective upon interruption or deenergization to cause an emergency application of the brakes on the car. For the purpose of interrupting wire 44, various switch devices are arranged in series relation therein. For example, included in series relation in wire 44 are a pair of track trip switch devices 46f and 46r located in a suitable position at front and rear ends of the car respectively so as to cooperate with a wayside tripping device (not shown) on the track, a manually operated switch hereinafter called a conductor's switch 47, and a low pressure switch 271 hereinafter described.

Associated with the master controllers 14f and 14r respectively are so-called propulsion prevention relays 51f and 51r, one of these relays at the control station at which the operator is located being effective as long as an energizing circuit for the relay including another train wire 43 is interrupted, to prevent the operation of the actuator 13 under the control of the master controller 14f or 14r to effect the supply of propulsion current to the car motors.

Included in the energizing circuit of the propulsion prevention relay at front and rear control stations respectively are "deadman" switches 52f and 52r, door relays 53f and 53r, and so-called speed switches 54f and 54r, the latter being adapted to be opened automatically only when the speed of rotation of the motor armatures exceed a certain maximum value corresponding to a vehicle speed, such as forty miles per hour. Also included in the energizing circuit of the propulsion prevention relays 51f and 51r, as in the train wire 43 so as to function for both relays, is a switch 48, hereinafter designated the brake release check switch, which is not closed unless the fluid pressure wheel brakes on the same unit of the train are completely released.

Each of the door relays 53f and 53r is selectively energized under the control of the master reverser 15f or 15r respectively, depending upon the control station at which the operator is stationed, by current supplied from the opposite control station of the car or train over a train wire 57. Wire 57 extends from end to end of a car and contains in series relation therein one or more door switch devices 58, only one of which is shown, which switches are closed only when a door associated therewith is in closed position.

It will be seen from previous description that there are a total of eleven so-called train wires extending from end to end of each car, opposite ends of each wire terminating in a suitable contact member in a coupling device (not shown) and adapted to be connected through the coupling device to a corresponding wire of an adjacent car or unit when coupled therewith.

Associated with and connected in series relation in a corresponding branch wire of each of the reverser wires 31 and 32 as well as the wires 43, 44 and 57 at each end of the car are coupler switches 31f, 32f, 43f, 44f and 57f respectively for the front end of a car and 31r, 32r, 43r, 44r and 57r for the rear end of a car. These coupler switches are diagrammatically shown but it should be understood that they are of any suitable construction so as to be closed only when another car or unit is not coupled to that end of the car and so as to be open when another car is coupled to that end of the car.

It should accordingly be understood that when a plurality of cars or units are coupled together, only the coupler switches at the front end of the first car and at the rear end of the last car or unit are closed, the coupler switches at the intermediate ends of cars or units being open. Thus although, in the subsequent description of the operation of my present equipment, the circuits are traced from one end of the car to the other, it should be understood that in a multiple unit arrangement, the circuits will extend through all intervening cars from the first to the last and that only the circuits through the coupler switches at the front end of the first car and the rear end of the last car are established. It should be understood of course that any control devices which operate in response to the energization of the various train wires and located on the several cars of a multiple unit train will respond thereto.

At the front end control station of the car is provided a control switch 61f and a reset switch 62f, a control switch 61r and a reset switch 62r being similarly provided at the rear end control station of the car. The nature and function of these control and reset switches will be made apparent in the subsequent description of the equipment.

Before proceeding to a more detailed description of the parts of the above described equipment it is believed desirable to briefly describe the propulsion and braking means provided. For this purpose reference will be had partly to Figs. 1, 2 and 3 and partly to Fig. 5.

As shown in Fig. 5, four propulsion motors 64, 65, 66 and 67 are diagrammatically shown having rotor armatures and series field windings designated by the same reference numerals with the suffixes "a" and "f" respectively.

For the purpose of establishing suitable connections, hereinafter to be described in detail, for supplying propulsion current to the motors to propel the car, a pair of propulsion relays 68 and 69 respectively and an overload relay 71 are provided.

For the purpose of controlling the operation of the car motors to function as dynamic brakes, a dynamic braking relay 72 is provided. A motor control rheostat 73 is also provided which is diagrammatically shown as a resistor having a movable tap connection. It will be understood that the rheostat 73 is adapted to be connected in circuit with the motors during propulsion and during dynamic braking and automatically operated as by a rheostat motor (not shown) so as to control the acceleration and the deceleration of the motors in conventional manner.

The magnetic track brake equipment may comprise a plurality of magnetic track brake devices 75, only two being shown for purposes of illustration. The magnetic track brake devices 75 may be of any suitable construction, each comprising a track engaging shoe portion of magnetic material 76 and suitable electromagnet windings 77. The entire brake device may be suspended, as by coil springs 78 attached to a fixed part 79 of the vehicle wheel truck, a certain normal distance above a track rail. Movement of the magnetic track brake device downwardly into engagement with the track rail in opposition to the springs 78 is effected in response to the energization of the electromagnet windings 77.

The electromagnet windings 77 of the magnetic track brake devices 75 are energized by current supplied from the multiple connected storage batteries 38 on all cars or units, which as previously stated may have 32 or 64 volt terminal voltage, under the control of the brake controller 12 which cuts out successive portions of a resistor 82 to correspondingly increase the degree of energization of the electromagnet windings 77 as the displacement of the brake controller out of its normal position increases.

Energization of the electromagnet windings 77 of the track brake devices 75 is also effected, independently of the brake controller 12 and the resistor 82, by means of an emergency application relay 83 which operates on the train wire 44 and which is effective in the event of interruption or deenergization of the train wire.

Each unit or car is provided with a master contactor or circuit breaker 84 which is effective to control the supply of battery current to effect operation of the propulsion relays 68 and 69 and the dynamic braking relay 72, as well as the supply of battery current for energizing the electromagnet windings of the magnetic track brake devices 75.

The fluid pressure brake equipment on each unit or car may comprise a plurality of brake cylinders 86, only two being shown for purposes of illustration at opposite ends of each car, effective upon the supply of fluid under pressure thereto to cause the application of wheel brake devices. Fluid under pressure is supplied to the brake cylinders 86 on each car from a reservoir 87 on the corresponding car which is charged with fluid under pressure as from a fluid compressor (not shown) located on the car. Fluid under pressure is supplied to the brake cylinders 86 from the reservoir 87 under the control of a well-known type of self-lapping brake control valve 88 having a rotary operating shaft 89 suitably connected to and operated synchronously with the brake controller 12 as indicated by the broken line.

Interposed in the fluid pressure communication between the brake valve 88 and the brake cylinders 86 is a by-pass magnet valve 91 which has an electromagnet winding that is connected in parallel relation to the emergency application relay 83 and operates on the emergency train wire 44. The by-pass magnet valve 91 normally establishes communication between the brake valve 88 and the brake cylinders 86 as long as the train wire 44 is energized and is effective to close off such communication and establish another communication from the reservoir 87 to the brake cylinders 86, independently of the brake valve 88, in the event of interruption or deenergization of the train wire 44.

Interposed in the fluid pressure communication between the by-pass magnet valve 91 and the brake cylinders 86 is a so-called suppression magnet valve 93. The electromagnet winding of the suppression magnet valve 93 is energized by the dynamic braking current of the vehicle motors, or a current corresponding thereto, in the manner hereinafter to be described and is effective as long as the current exceeds a certain value to prevent the supply of fluid under pressure to the brake cylinders 86. This suppression feature is well understood and known and is for the purpose of holding off the application of the fluid pressure brakes until the dynamic brake decreases in effectiveness with the reducing speed of the car or train below a certain value, so as to maintain an adequate braking effect as the car or train comes to a stop.

Connected in parallel relation to the deadman switches 52f and 52r are suppression switches 94f and 94r respectively, these switches being responsive to the pressure of the fluid supplied to the brake cylinders 86 for the purpose of suppressing a deadman emergency application of the brakes if a certain pressure, such as 30 to 40 per cent of maximum brake cylinder pressure, has been established.

DETAILED DESCRIPTION OF PARTS OF EQUIPMENT (a) *Propulsion controller 11, brake controller 12 and actuator 13*

The propulsion controller 11 shown in Figs. 2 and 5 comprises a suitable casing in which is journaled for rotary movement a rotary drum 11d carrying on the outer surface thereof in insulated relation to the drum and one another a pair of contact elements 11a and 11c.

As shown in Fig. 2, an operating arm is fixed at one end to the shaft of the controller drum 11d for effecting rotation thereof. The arm 101 is biased to a normal position as by a tension spring 102 fixed at one end to the casing of the controller 11 and at the other end to the arm.

The rotary drum of controller 11 is indicated fragmentally in Fig. 2 as exterior to the casing thereof but it will be understood that this is merely for convenience of illustration. As shown in Fig. 5, the rotary drum of controller 11 has a normal position designated "release-coasting" position and five additional positions successively reached as the degree of displacement of the rotary drum in the direction indicated by the arrow out of its normal position increases, these positions being designated respectively as "switching" position and "accelerating" positions 1, 2, 3 and 4 in the order reached.

In the normal position of the rotary drum of the propulsion controller 11, the contact element 11b engages a pair of associated fixed contact members carried by the casing in insulated relation; and the contact element 11a is disengaged from a corresponding pair of fixed contact members carried in insulated relation by the casing. The contact element 11b is of such nature as to engage the associated contact fingers only in the "release-coasting" position of the rotary drum of the controller and forms an interlock switch in the circuit of the dynamic braking relay 72 which prevents operation of that relay unless the propulsion controller drum is in its "release-coasting" position.

The contact element 11a on the propulsion controller drum is adapted to engage its corresponding pair of associated contact members and remain in engagement therewith when the rotary drum is shifted out of the "release-coasting" position and while it is in all other positions and functions as a control switch for the propulsion relays 68 and 69.

While omitted for simplicity, it will be understood that suitable means is provided in association with the propulsion controller drum for the purpose of controlling the operation of the rheostat 73 to effect different desired rates of acceleration of the motors in the different propulsion positions.

The brake controller 12 is similar in appearance to the propulsion controller 11 and comprises a casing having a rotary drum 12d journaled therein and adapted to be rotated by means of an operating arm 101 which is biased toward a normal position by a tension spring 102. For convenience, the rotary drum 12d of the controller 12 is shown outside the casing in Fig. 2 but it will be understood that actually it is contained within the casing.

In this connection, it should be mentioned that the rotary operating shaft 89 of the brake valve 88 is suitably connected as indicated by the broken line to the shaft of the rotary drum 12d of controller 12 so that the rotary drum and the operating shaft are rotated together upon rotary displacement of the operating arm 101 out of its normal position in a counterclockwise direction as indicated by the arrow. The degree or angle of displacement of the operating shaft 89 of the brake valve 88 need not necessarily be the same as that of the controller 12 since the rotary operating shaft 89 may be connected through a suitable gear mechanism to the operating shaft of the rotary drum of the controller 12 to move through a desired angle proportional to the angle of displacement of the operating arm 101.

As will be apparent in Fig. 2, the respective operating arms 101 of the propulsion controller 11 and brake controller 12 are operated by a common actuating bar or rod 104. The operating bar 104 is provided with slots 105 at opposite ends thereof, and a pin 106 carried by the clevis at the outer end of each operating arm 101 extends through the corresponding slot 105. Normally, both operating arms 101 of the two controllers 11 2 are biased to the inner end of the corresponding slot 105 so that, upon movement of the operating arm 104 in the right-hand direction, rotary displacement of the operating arm 101 of only the propulsion controller 11 is effected and, upon movement of the operating bar in the left-hand direction rotary displacement of the operating arm 101 of only the brake controller 12 is effected. The two controllers 11 and 12 are thus interlocked through the actuating bar 104 so that both controllers cannot be simultaneously operated.

As indicated in Fig. 5, with the operating arm 101 of the brake controller 12 biased to its normal position, the rotary drum 12d is in a corresponding position designated "release-coasting." As the arm 101 of the brake controller 12 is shifted in a counterclockwise direction out of its normal position as seen in Fig. 2, the rotary drum 12d is shifted correspondingly in the left-hand direction, as indicated by the arrow in Fig. 5, and passes successively through a plurality of service application positions designated successively 1, 2, 3, 4, 5 and 6 and lastly into a position designated "Emergency" position.

Carried in insulated position on the rotary drum 12d are a plurality of contact elements designated 12a, 12b, 12c, 12e and 12f respectively.

The contact element 12a is adapted to engage a pair of stationary contact members, carried in insulated relation by the casing in every position of the rotary drum 12d except "emergency" position and serves as a switch to control the closing of the master circuit-breaker 84 on the car.

The contact element 12b is stepped and is effective when the rotary drum 12d is shifted out of "release-coasting" position to engage successive contact members, stationarily carried in insulated relation by the casing, to complete the energizing circuit for the electromagnet windings 77 of the magnetic track brake devices 75 and, as the degree of displacement of the rotary drum 12d increases, successively shunt out an increasing amount of the resistor 82 to increase the degree of energization of the electromagnet windings 77 and consequently the degree of retarding effect produced by the track brake devices 75.

The contact element 12c is adapted to engage a pair of associated stationary contact members only in the "release-coasting" position of the rotary drum 12d and serves as an interlock switch in the energizing circuit for the propulsion relays 68 and 69 to prevent the supply of power current to the motors unless the rotary drum 12d of the brake controller 12 is in "release-coasting" position.

The contact element 12e is adapted to engage a pair of associated stationary contact members when the rotary drum 12d is shifted out of "release-coasting" position and to maintain engagement therewith in all positions other than the "release-coasting" position, the function of this contact element being to control the dynamic braking relay 72 to effect dynamic braking of the car motors.

The contact element 12f is similar to the contact element 12c and engages a pair of associated stationary contact members only in the "release-coasting" position of the rotary drum 12d. This contact element serves as an interlock switch in the reset circuit for the overload relay 71 to prevent resetting, that is reclosing, of the overload relay 71 unless the rotary drum 12d of the brake controller 12 is in "release-coasting" position.

It will be understood that, although not shown, suitable contact elements are provided on the rotary drum 12d or other suitable mechanism provided for controlling the operation of the rheostat 73 in conventional manner so as to control the degree of dynamic braking effect in accordance with the degree of displacement of the drum 12d out of "release-coasting" position.

Movement of the operating bar 104 is effected by the actuator 13. The actuator 13 is diagrammatically shown in Fig. 2 as comprising a tubular casing or cylinder 111 in which operates a pair of pistons 112 joined together by a connecting stem 113, the cylinder 111 being of such length as to permit reciprocatory movement of the pistons therewithin to a desired degree. The casing 111 of the actuator 13 is adapted to be secured in fixed relation to the frame or body of the vehicle and an operating lever 115, pivoted at one end to a fixed part 110 of the vehicle and at the opposite end to the stem 113 connecting the pistons, is adapted to effect movement of the operating bar 104 according to the movement of the pistons 112. The casing 111 is provided with a suitable opening 116 in the lower wall thereof, at a point between the pistons 112, to enable the lever 115 to extend into the casing so as to be connected to the stem 113. Accordingly the space between pistons 112 is constantly at atmospheric pressure. As shown in Fig. 2, the end of the lever 115 has a slotted clevis to receive a pin 117 fixed to or formed on the piston stem 113. The lever 115 is also provided with a suitable slot 118 intermediate the ends thereof for receiving a pin 119 fixed to or formed on the operating bar 104.

With the operating arms 101 of the two controllers 11 and 12 both in their "release-coasting" positions, the pistons 112 occupy a central position in the casing 111 as shown. Upon the shifting of the pistons in the left-hand direction from the position shown in the drawings, the lever 115 is correspondingly rocked in a counterclockwise direction to shift the operating bar 104 proportionately in the left-hand direction. Conversely, when the pistons 112 are shifted in the right-hand direction from the position shown, the lever 115 is rocked in a clockwise direction to shift the operating bar 104 proportionately in the right-hand direction.

The movement of the pistons 112 is effected by fluid under pressure supplied to the two piston chambers formed at the corresponding outer ends of the casing 111, under the control of suitable magnet valve devices 121 and 122 shown at the right and left hand ends of the casing 111 respectively.

The magnet valve device 121 comprises a double beat valve 123 which is contained in a chamber 124 that is constantly open to the piston chamber of the associated right-hand piston 112, the double beat valve 123 being biased to an upper seated position by a coil spring 125 and actuated against the yielding opposing force of the spring 125 to a lower seated position in response to energization of an electromagnet winding 126. With the double beat valve 123 in its upper seated position, communication is established past the valve from the chamber 124 to a chamber 127 which is constantly connected by pipes 128, 129 and 130 to the reservoir 87 on the corresponding unit or car. With the double beat valve 123 in its lower seated position, the chamber 124 and associated piston chamber are connected past the valve to a chamber 132 which is constantly open to atmosphere through an exhaust port 133.

The magnet valve 122 comprises a double beat valve 134 which is contained in a chamber 135 that is open to the piston chamber of the left-hand piston 112. The double beat valve 134 is urged to an upper seated position by a coil spring 136 and operated against the yielding force of the spring 136 to a lower seated position upon energization of either of two electromagnet windings 137 and 138 respectively. With the double beat valve 134 in its upper seated position, communication is established past the valve 134 from the chamber 135 and connected piston chamber to a chamber 139 that is constantly open to atmosphere through an exhaust port 141. With the double beat valve 134 in its lower seated position, the exhaust communication just described is closed and communication is opened past the valve between the chamber 134 and connected piston chamber to a chamber 142 that is constantly connected by a pipe 143 and the pipes 128, 129 and 130 to the local reservoir 87 of the corresponding car.

It will thus be apparent that with the electromagnet winding 126 of the magnet valve 121 deenergized the piston chamber of the right-hand piston 112 is charged to the pressure in the reservoir 87 and similarly that with either of the electromagnet windings 137 and 138 of the magnet valve 122 energized, the piston chamber of the left-hand piston 112 is likewise charged with fluid at the pressure in the reservoir 87. Accordingly, in order to effect movement of the pistons 112 in the right-hand direction, energization of the magnet winding 126 of the magnet valve 121 must be effected so as to vent fluid under pressure from the piston chamber of the right-hand piston 112 and energization of one of the magnet windings 137 or 138 of magnet valve 122 must be simultaneously effected so as to supply fluid under pressure to the piston chamber of the left-hand piston 112. Conversely, in order to shift the pistons 112 in the left-hand direction from the position shown, both of the magnet windings 137 and 138 of the magnet valve 122 must be deenergized so as to vent fluid under pressure from the piston chamber of the left-hand piston 112 while, at the same time, the electromagnet winding 126 of magnet valve 121 must be deenergized to supply fluid under pressure to the piston chamber of the right-hand piston 112.

Whenever the piston chambers of both of the pistons are simultaneously charged with fluid under pressure from the reservoir 87, the fluid pressure forces on the pistons are equal and opposite, that is balanced, and accordingly the pistons remain in the position which they have attained at the time balance occurs.

(b) *The master controllers 14f and 14r*

According to our invention, the magnet valves 121 and 122 are controlled by means of the master controller 14f or 14r and the selector relays 26, 27, 28 and 29.

The master controller 14f, and in similar manner the master controller 14r, comprises a rotary drum 14d indicated in developed form and having thereon in insulated relation seven contact elements 1, 2, 3, 4, 5, 6 and 7 adapted to cooperatively engage a row of stationary contact members a, b, c, d, e, f, g, h, i, j, k, l, m, n and o. The rotary drum 14d of each of the master controllers is carried on a suitable shaft, not shown, journaled in a casing and carrying a removable operating handle. Although not shown, it will be understood that the removable handle of the master controller cooperates with a suitable slot in the casing of the master controller so as to be removable only in a given position designated "handle-off" position. Furthermore, it will be understood that the nature of the slot in which the handle of the master controller operates is such as to require the handle to be raised from its normal plane of movement in order to enter the "handle-off" position.

It will be understood that all of the master controllers on the several units or cars of the train remain in "handle-off" position except the one at which the operator is stationed. The normal position of the operating handle of the master controller at the station where the operator is located is designated "release-coasting" position. The arrangement of the master controller positions is such that in order to reach the "release-coasting" position from the "handle-off" position, the operating handle must be shifted successively through a plurality of brake control positions designated "Emergency" and 6, 5, 4, 3, 2, 1, in the order mentioned. Upon continued movement of the operating handle away from "handle-off" position out of the "release-coasting" position, the handle passes successively through a plurality of propulsion positions designated respectively "Switching" and "Accelerating" 1, 2, 3, 4, in the order mentioned.

If the operating handle is shifted from the "handle-off" position in the opposite direction from the "release-coasting" position, it is moved into a position designated "Trip" position.

It is unnecessary at this time to describe the specific character of the contact elements 1 to 7 on the drum 14d of the master controllers except to point out that in the various braking or propulsion positions, a corresponding combination of the four train wires 16, 17, 18 and 19 are energized or deenergized so as to correspondingly energize or deenergize the selector relays 26, 27, 28 and 29.

The chart shown in Fig. 4 indicates which of the relays 26, 27, 28 and 29 are energized or deenergized in the various control positions of the master controller handle. For example, with the operating handle of the master controller 14f in its "release-coasting" position, the relays 26 and 29 only are energized, the relays 27 and 28 being deenergized.

The arrangement of the relays 26, 27, 28 and 29 is such as to selectively set up circuits through contact members thereof to energize a corresponding one of a plurality of contact fingers 151 to 162 mounted in insulated relation within the casing 111 of the actuator 13 and cooperatively associated with a short contact segment 164 and a long contact segment 165 carried in insulated relation to each other on the connecting stem 113 of the actuator pistons 112. The twelve contact fingers 151 to 162, inclusive, are arranged in a row longitudinally of the casing 111 in substantially equal spaced relation to each other.

The short contact segment 164 is connected by a wire 166, including a flexible portion that extends through the opening 116 in the casing 111, to one terminal of the electromagnet winding 138 of the magnet valve device 122. The long contact segment 165 is connected by a flexible wire 167 to a wire 168 which is connected to one terminal of the electromagnet winding 126 of the magnet valve 121 and one terminal of the electromagnet winding 137 of the magnet valve device 122.

The opposite terminal of the electromagnet winding 137 is connected by a branch wire 171 to a wire 172, which is connected to the remaining terminals of the electromagnet windings 126 and 138, the wire 172 being connected in turn by a branch wire 173 to the branch wire 37 that is connected to the negative terminal of the battery 38.

As will be hereinafter described, the arrangement of the contact fingers 151 to 162 with the contact segment 164 and 165 is such that when one of the contact fingers is energized, that is, connected to the positive terminal of the battery 38 in the manner hereinafter to be described, the magnet valve devices 121 and 122 are automatically controlled so as to cause the pistons 112 to be shifted until the short contact segment 164 engages the particular contact finger energized, at which time the fluid pressure in the piston chambers of the two pistons 112 is equalized so that the pistons are thereupon stopped in a corresponding position.

As will be evident in Fig. 2, the relays 26 to 29 are provided with one or more contact fingers which are actuated to an upper position when the relays are energized and biased to a lower position when the relays are deenergized. The relay 26 has a plurality of contact members 26a, 26b, 26c, 26d, 26e, 26f, 26g, 26h. The relay 27 has a plurality of contact members 27a, 27b, 27c, 27d, and 27e. The relay 28 has a pair of contact members 28a and 28b respectively. The relay 29 has only one contact member 29a.

It is believed unnecessary to trace the various connections through the contact members of the four relays 26, 27, 28 and 29 to cause the selective energization of the contact fingers 151 to 162 as they should be sufficiently apparent from the drawings. It is deemed sufficient, therefore, merely to state that the contact finger 157 is energized, that is connected to the positive terminal of the battery 38, when the operating handle of the master controller 14f or 14r is in "release-coasting" position. Similarly, the contact fingers 151, 152, 153, 154, 155 and 156 are respectively energized when the operating handle of either master controller 14f or 14r is in the braking positions 1, 2, 3, 4, 5 and 6 respectively. Also, the contact fingers 158, 159, 160, 161 and 162 are respectively energized when the operating handle of the either master controller 14f or 14r is in "switching" position and accelerating positions 1, 2, 3, 4 respectively.

In the drawings, it is assumed that the operator is stationed at the front end control station and that master controller 14f at the front end control station is in "release-coasting" position while the master controller 14r at the rear end control station is in "handle-off" position. Observing the chart in Fig. 4, it will be seen that only relays 26 and 29 are energized in this position of the operating handle of the master controller 14f. Thus, assuming that the positive terminal of the battery 38 is connected to the train wire 44 in the manner hereinafter to be made apparent, the circuit extends through a branch wire 175 of the wire 44, a branch wire 176 of the wire 175, contact member 29a of relay 29 in its upper position, a wire 177, contact member 28a of relay 28 in its lower position, a wire 178, contact member 27b of relay 27 in its lower position, a wire 179, contact member 26d of relay 26 in its upper position, and a wire 181 to the contact finger 157.

With the short contact segment 164 on the piston stem 113 engaging the contact finger 157 as shown in Fig. 2, the circuit continues by way of the contact segment 164, wire 166, electromagnet winding 138 of magnet valve 122, and wires 172, 173 and 37 to the negative terminal of the battery 38. Accordingly, the electromagnet winding 138 is energized and the double beat valve 134 is shifted to its lower seated position, as shown, so that fluid under pressure is supplied from the reservoir 87 to the piston chamber of the left-hand piston 112 by way of the pipes 130, 129, 128 and 143, chamber 142, past the double beat valve 134, and chamber 135.

At the same time, none of the other contact fingers are energized and thus the electromagnet winding 126 of the magnet valve 121, as well as electromagnet winding 137 of magnet valve 122, is deenergized. Accordingly, the double beat valve 123 of the magnet valve 121 is in its upper seated position so that fluid under pressure is likewise supplied to the piston chamber of the right-hand piston 112. The fluid pressures on the two pistons 112 are thus balanced and consequently the pistons remain stationary with the short contact segment 164 in contact with the contact finger 157 as shown.

If now, one of the contact fingers, such as the contact finger 156, is energized in correspondence with the positioning of the operating handle of the master controller 14f in the position designated "braking 6," the circuits just traced for energizing the electromagnet winding 138 is interrupted and consequently the double beat valve 134 of magnet valve 122 is shifted to its upper seated position to vent fluid under pressure from the piston chamber of the left-hand piston 112. Since the energized contact finger 156 does not engage the long segment 165, the electromagnet winding 126 of magnet valve 121 is deenergized and thus the piston chamber of the right-hand piston 112 is charged with fluid under pressure. The fluid pressure force is accordingly effective to shift the pistons 112 in the left-hand direction until the short contact segment 164 engages the contact finger 156 at which time the electromagnet winding 138 is again energized.

Reenergization of the electromagnet winding 138 of the magnet valve 122 accordingly cuts off the venting of fluid under pressure from the piston chamber of the left-hand piston 112 and causes fluid under pressure to be resupplied thereto to balance the fluid pressure forces on the two pistons. The pistons thus remain stationary in the position in which the short contact segment 164 engages the contact finger 156.

On the other hand, if one of the contact fingers, such as the contact finger 162 corresponding to accelerating position 4 of the operating handle of the master controller 14f, is energized the circuit for energizing the electromagnet winding 138 of the magnet valve 122 is interrupted because the contact finger 162 is not in engagement with the short contact segment 164. However, since the energized contact finger 162 engages the long segment 165, the magnet windings 126 and 137 of the magnet valve devices 121 and 122 respectively are energized, the circuit extending from the contact finger 162 by way of the long contact segment 165, flexible wire 167, the two branches of the wire 168 to the electromagnet windings 126 and 137, and thence by way of the wires 171, 172, 173 and 37 to the negative terminal of the battery 38. With the magnet valves 121 and 122 both energized it will be apparent that fluid under pressure is supplied to the piston chamber of the left-hand piston 112 while fluid under pressure is vented from the piston chamber of the right-hand piston 112. The pistons 112 are accordingly shifted in the right-hand direction until such time as the contact finger 162 runs off the long segment 165 and engages the short contact segment 164. At such time, the magnet winding 126 of the magnet valve device 121 and the magnet winding 137 of the magnet valve device 122 are deenergized while, due to the engagement of the short contact segment 164 with contact finger 162, the electromagnet winding 138 of the magnet valve device 122 is reenergized. Thus fluid under pressure is again simultaneously supplied to the piston chambers of both piston 112 and, since the fluid pressure forces on the pistons are thus balanced, the piston remains stationary in the position attained.

It will be apparent that if the pistons 112 of the actuator over-run, that is, move past the position in which the short contact segment 164 engages the energized contact finger, the magnet valves are automatically controlled to return the pistons to such position. Furthermore, it should be seen that, although we have shown the contact fingers 151 to 162 as being associated with the segments 164 and 165 on the piston stem 113, the contact fingers may be arranged in a row or in circular fashion about any element, such as the controller drums of the two controllers that moves according to the movement of the pistons 112.

It will now be apparent that by suitably designing the lever 115, the operating bar 104 and the operating arms 101, the rotary drum of the propulsion controller 11 and the rotary drum of the brake controller 12 are automatically shifted to positions corresponding to the position of the operating handle of the master controller 14f or 14r. Furthermore, it will be understood that the contact fingers 151 to 162 are relatively narrow and that the contact segment 164 is very narrow or short so that the pistons 112 and, correspondingly, the rotary drums of the propulsion controller 11 and brake controller 12 are accurately and uniformly positioned on all of the several units or cars of the train for a given control position of the master controller 14f.

(c) Master reversers 15f and 15r

The master reversers 15f and 15r located at front and rear control stations of each car are similar in construction and operation. As seen in Fig. 1, master reverser 15f comprises a rotary drum 15d, shown in developed form, adapted to be shifted into any one of three different positions designated "forward", "off" and "reverse" respectively by means of the operating handle of the master controller which is removably secured to the end of the shaft of the drum 15d. Fixed on the drum 15d are a plurality of cams arranged in three rows, the cams of the respective rows being designated 192, 193 and 194. The cams are suitably arranged and spaced so as to selectively open or close cooperating switches 201 to 212. The cams 192 are effective, when the rotary drum 15b is in its "forward" position, to close switches 201, 203, 205, 207, 209, the remainder of the switches being open. The cams 193 are effective, when the rotary drum 15b is in "off" position, to close the switches 202, 204, 206, 208, 210 and 212, the remainder of the switches being open. The cams 194 are effective, when the rotary drum 15d is in "reverse" position, to close the switches 201, 203, 205, 207, and 211, the remainder of the switches being open.

The master reverser 15r at the rear control station differs from the master reverser 15f of the front control station in that the groups of cams 192 and 194 are reversed in position so that those of the switches 201 to 212 which are closed in the "forward" position of the drum 15d of the reverser 15r correspond to those of the master reverser 15f that are closed in "reverse" position. Similarly, those of the switches 201 to 212 of the master reverser 15r that are closed in the "reverse" position of the rotary drum 15d thereof correspond to those switches of the master reverser 15f that are closed in the "forward" position of the rotary drum 15d thereof.

The arrangement of the cams 193 of the two master reversers 15f and 15r is identical so that the same switches of the group 201 to 212 are closed with the rotary drum 15d in "off" position in both cases.

It will be understood that only the master reverser at the control station at which the operator is located is shifted out of "off" position into either "forward" or "reverse" position. Thus the master reverser 15r is shown in "off" position and the master reverser 15f is shown in "forward" position.

The manner in which the master reversers 15f and 15r function in the control circuits will be made apparent hereinafter.

The headlight and rear-end lights of a car or train may be controlled automatically according to the position of the reversers at the front and rear control stations of a car or train. For example, the headlight, designated W, may be connected in series-circuit relation with the switch 203 of each reverser in a simple circuit, readily apparent from the drawings (Fig. 1 or 3), extending from the positive battery wire 34 to the negative terminal of the battery through a ground connection so that the headlight is illuminated with a white light in response to the closure of the switch 203 whenever the master reverser drum is in "forward" or "reverse" position. In a similar manner, one or more rear-end lights, designated R, may be connected in series-circuit relation with the switch 204 of each reverser across the positive battery wire 34 and ground so as to be illuminated red when the master reverser drum is in "off" position. If desired, the same or similar circuits may be employed for position indicating lamps associated with the reversers.

(d) Control switches 61f and 61r; reset switches 62f and 62r

The control switches 61f and 61r and the reset switches 62f and 62r are conventional two-position switches diagrammatically indicated. The control switches are of the snap or key type adapted to be operated and remain in either of two positions to selectively open and close corresponding different circuits in the different positions. The reset switches are normally biased to one of two positions and require the continued application of pressure by the operator in order to remain in the other of the two positions. The manner in which the control and reset switches function in the equipment will be made apparent subsequently.

(e) Master circuit breaker 84

The master circuit breaker 84 shown diagrammatically in both Figs. 2 and 5, comprises an electromagnet winding or solenoid 84a and an associated armature carrying in insulated relation thereon a pair of contact members 84b and 84c. When the electromagnet winding 84a is energized, the contact members 84b and 84c are actuated from an open-circuit position to a closed-circuit position in contact with a pair of fixed associated contact members.

The circuit breaker 84 further comprises an automatic latching mechanism for holding the armature of the circuit breaker in a position to maintain the contact members 84b and 84c in closed-circuit position. The latching mechanism comprises a lug 215 on the armature and a pivoted latch member 216 which is biased by a spring 217 toward the lug 215. The end of the latch member 216 is beveled to permit the lug 215 on the armature to move the latch lever 216 outwardly against the yielding resistance of the spring 217 until the lug is past the hook or shoulder at the end of the latch member, whereupon the spring 217 is effective to urge the latch member inwardly to support and maintain the armature in a circuit-closed position, independently of whether the electromagnet winding 84a continues to be energized.

Associated with the latch member 216 is a trip or release coil 218 that is effective, when energized, to actuate a plunger 219 in a direction to withdraw the latch member 216 from latched relation with the lug 215 and thus permit the armature of the circuit breaker to be returned to its circuit-opening position by conventional biasing means (not shown).

In order to further assure the maintenance of the circuit breaker 84 in circuit-closing position, a holding circuit for the electromagnet winding 84a is provided which includes, in series-relation, contact member 84b of the circuit breaker and a switch member 220 carried in insulated relation on the release plunger 219. Switch member 220 is actuated to circuit-opening position when the trip coil 218 is energized to withdraw the latch member 216. This holding circuit will be more fully described hereinafter.

(f) Control relays or switches

The various control relays are all indicated diagrammatically in the drawings and the construction and operation thereof should be apparent from the drawings. A brief description of the relays will be helpful, however, and is accordingly given.

The emergency relays 41f and 41r are identical in constrution and each comprises two electromagnet windings 41a and 41b and two contact members a and b. Either of the two windings 41a and 41b is effective, when energized, to actuate the contact members a and b from circuit-open to circuit-closed position and hold them therein.

The propulsion prevention relays 51f and 51r are identical in construction and each comprises an electromagnet winding 51a which is effective when energized to actuate four contact members a, b, c, and d respectively from a lower position to an upper position. The contact members a, b, c, and d of both relays 51f and 51r are connected to the train wires 16, 17, 18 and 19 respectively by branch wires 16a, 17a, 18a and 19a.

In the upper position thereof, the contact members a, b, c, and d of the propulsion prevention relays 51f and 51r respectively connect the contact members a, c, e and g of the corresponding master controller 14f or 14r to the branch wires 16a, 17a, 18a and 19a. In the lower position thereof, the contact members a, b, c and d of the relays 51f and 51r respectively connect the contact members b, d, f, and h of the corresponding master controller to the branch wires 16a, 17a, 18a and 19a.

The door relays 53f and 53r are identical in construction and each comprises an electromagnet winding 53a and only one contact member a which is actuated from a circuit-open to a circuit-closed position upon energization of the winding.

In this connection, switches 50f and 50r are connected in parallel relation to the contact member a of the relays 53f and 53r respectively.

The switches 50f and 50r are of the push-button type, normally biased to an open position, and adapted to be held closed by the application of pressure thereto by the operator. The purpose of the switches 50f and 50r is to by-pass the contact member a of the door relays 53f and 53r and are hereinafter referred to as door relay cut out switches.

The low pressure switch 271 is indicated as of the Bourdon type. It is connected so as to be constantly subject to the pressure in the reservoir 87, as by connection to the pipe 128. As long as the pressure in the reservoir is above a certain pressure such as 90 pounds per square inch, the switch 271 is closed. When the pressure in the reservoir 87 falls below such value, the switch 271 opens.

If desired, a manually operated switch 282 of the push-button type may be provided, as shown, in parallel relation to switch 271 for by-passing switch 271 when switch 271 is open. Switch 282 will hereinafter be referred to as the low pressure cut-out switch.

Referring to Fig. 5, each of the propulsion relays 68 and 69 comprises an electromagnet winding and a pair of contact members, the winding being designated by the same reference numeral as the relay with the suffix a, and the two contact members being designated solely by the letters a and b respectively. The relay contact members a are in circuit-open position while the contact members b are in a circuit-closed position with the magnet winding of the relay deenergized. Upon energization of the magnet winding, the contact members a and b are actuated to circuit-closed and circuit-open position respectively.

The overload relay 71 comprises an electromagnet winding 71a and an associated armature having in insulated relation thereon a pair of contact members a and b. The magnet winding 71a is in series with the car motors and is energized by the propulsion current supplied to the car motors. The magnet winding 71a is so designed, however, that unless the propulsion current supplied to the car motors becomes excessive, that is exceeds a certain maximum safe value, it is ineffective to actuate the armature out of a normal position thereof. When the magnet winding is energized by an excessive propulsion current, the armature is actuated from its normal position, in which the contact members a and b are in circuit-closed and circuit-open position respectively to a position in which the contact members a and b are in circuit-open and circuit-closed position respectively.

Associated with the armature of the overload relay 71 is a latching mechanism which is effective, when the armature of the relay is actuated to the last mentioned position, to lock it therein automatically. The latching mechanism comprises a lug 225 on the armature and a cooperating latch member 226 which is biased toward the lug 225 by a coil spring 227. When the armature is actuated in response to the energization of magnet winding 71a by an excessive propulsion current, the lug 225 is moved past the latch member 226 which is provided with a shoulder thereon for thereafter holding the armature in its actuated position. A release or reset coil 228, having an associated plunger connected to the latch member 226, is provided for withdrawing the latch member 226 to permit the restoration of the armature to its normal position upon energization of the reset coil 228. The circuit for energizing reset coil 228 of the overload relay 71 is established by way of the contact member b of the overload relay so that the coil cannot be energized unless the overload relay is in its actuated position.

The dynamic braking relay 72 comprises an electromagnet winding 72a having an associated armature carrying in insulated relation thereon three contact members a, b, and c respectively. When the electromagnet winding 72a is deenergized, the contact member a is in a circuit-closed position while the contact members b and c are in circuit-open position. When the magnet winding 72a is energized, the contact member a is actuated to a circuit-open position while the contact members b and c are actuated to circuit-closed position.

(g) Fluid pressure brake control apparatus

Fluid under pressure is supplied to the brake cylinders 86 under the control of the self-lapping brake valve 88, by-pass magnet valve 91 and the suppression magnet valve 93.

As previously stated, the self-lapping brake valve 88 has a rotary operating shaft 89 rotatable with the drum of brake controller 12. When the operating shaft 89 of the brake valve 88 is rotated out of its normal position, fluid under pressure is supplied from reservoir 87 to a pipe 231 which leads to the by-pass magnet valve 91 and, ultimately, to the brake cylinders 86 if the by-pass magnet valve 91 and suppression magnet valve 93 are properly conditioned to permit the flow of fluid under pressure to the brake cylinders. The brake valve 88 is so constructed that the pressure established in the brake cylinders 86 under the control of the brake valve 88 will correspond or be in proportion to the degree of rotary displacement of the operating shaft 89 out of its normal position.

The by-pass magnet valve 91 comprises, as seen in Fig. 2, a double beat valve 232 contained in a chamber 233 and shifted to a right-hand seated position by coil spring 234 and to a left-hand seated position against the force of the spring 234 in response to energization of an electromagnet winding 235. When the double beat valve 232 is in its left-hand seated position, as shown, it establishes communication between the chamber 233 and a chamber 236 to which the pipe 231 leading from the brake valve 88 is connected, thus permitting the supply of fluid under pressure from the brake valve 88 through the chambers 236 and 233 of the by-pass magnet valve to a pipe 237 connected to the chamber 233 and leading to the suppression magnet valve 93. When the double beat valve 232 is in its right-hand seated position, the supply communication just described is closed and communication is established between the chamber 233 and a chamber 238 to which the pipe 143, in communication with the reservoir 87 as previously described, is constantly connected.

It will thus be seen that as long as the magnet winding 235 of the by-pass magnet valve 91 remains energized, fluid under pressure is supplied to the brake cylinders under the control of the brake valve 88 and that when the magnet winding 235 is deenergized, fluid under pressure is supplied to the brake cylinder directly from the reservoir 87 independently of the brake valve 88.

The suppression magnet valve 93 comprises, as seen in Fig. 1, a double beat valve 241 that is contained in a chamber 242 which is constantly connected to the brake cylinders 86 as by a branch pipe 247 and a pipe 248 leading to both brake cylinders. Valve 241 is shifted into relation on an associated right-hand valve seat by a coil spring 243 and into seated relation on an associated left-hand valve seat against the yielding force of the spring 243 by an electromagnet winding 244, through the medium of a plunger 245 acting on the valve, when the winding is energized.

With the valve 241 in its right-hand seated position, the chamber 242 is connected to a chamber 246 to which pipe 237 leading from the by-pass magnet valve 91 is constantly connected. With valve 241 in its left-hand seated position, communication between chamber 242 and chamber 246 is closed and communication between chamber 242 and a chamber 250, constantly open to atmosphere through an exhaust port 250a, is opened.

It will thus be seen that when the electromagnet winding 244 of the suppression magnet valve 93 is energized sufficiently to hold the valve 241 in its left-hand seated position, fluid under pressure supplied into the pipe 237 cannot reach the brake cylinders 86, because communication from pipe 237 to the brake cylinder pipe 248 is cut off by the valve. In the event of leakage past valve 241, fluid pressure cannot build up in the brake cylinders because they are vented to atmosphere by the exhaust port 250a. When the electromagnet winding 244 is energized insufficiently to hold the valve 241 in its left-hand seated position and the valve is thus shifted by spring 243 to its right-hand seated position, communication is established from the pipe 237 to the brake cylinder pipe 248 and fluid under pressure is accordingly permitted to flow to the brake cylinders to build up pressure therein.

As will be made apparent hereinafter, the electromagnet winding 244 is energized in accordance with the dynamic braking current supplied from the car motors 64 to 67 and the winding is so constructed and designed that as long as the dynamic braking current exceeds a certain predetermined value, the magnetic force exerted by the plunger 245 on the valve 241 is sufficient to hold it in its left-hand seated position and thus prevent the supply of fluid under pressure from the pipe 237 to the brake cylinders 86.

OPERATION

In the following description of the operation of the equipment, reference will be had to the single car equipment shown in Figs. 1, 2, 3 and 5. It will be understood, however, that this is for simplicity only and that in actuality there are a number of cars coupled together. Thus, if the equipment at the rear control station of the single car shown in Figs. 1 to 3 is taken to be that on the rear end of the last car of a multiple unit train the operation will be readily apparent.

(a) Conditioning of equipment

Let it be assumed that the operator is stationed at the front end control station, shown in Fig. 1, with the master reverser 15f in "forward" position and the operating handle of the master controller 14f in "release-coasting" position, while the master reverser 15r and the master controller 14r at the rear end control station are in "off" and "handle-off" positions respectively. Let it be further assumed that the control switch 61f has been operated by the operator to its lower position shown, while the control switch 61r is in its upper position, and that the two reset switches 62f and 62r are in their normal positions as shown.

Let it be further assumed that the operator is manually holding the deadman switch 52f in closed position and that the deadman switch 52r is at the same time in open position.

As will be explained hereinafter, the equipment is such that unless the emergency relays 41f and 41r are both picked-up, that is energized, it is impossible for the vehicle to be moved by the propulsion motors. The pick-up of the emergency relays 41f and 41r is effected automatically upon the installation of the operating handle on the master controller and its movement to the "release-coasting" position. It will be recalled that in order for the operating handle of the master controllers to reach the "release-coasting" position, it must pass successively through "emergency" position and the six braking positions. As the operating handle of the master controller 14f is shifted from "handle-off" position into "emergency" position the contact element 3 on the rotary drum 14d of the master controller 14f connects the contact members j and k of the master controller and establishes a circuit for energizing the upper winding 41a of the emergency relay 41f.

Since the positive and negative terminals of battery 38 on each car are constantly connected by the branch wires 36 and 37 to the positive battery wire 34 and negative battery wire 35 extending from end to end of the car it will be understood that in the subsequent tracing of circuits the starting of a circuit from the positive battery wire 34 and the ending of a circuit with the negative battery wire 35 is the same as connection to the positive and negative terminals of the batteries. Also, since negative battery wire 35 is constantly grounded, the ending of a circuit at a ground connection is the equivalent of connection to the negative terminal of the batteries.

Accordingly, the circuit for energizing the upper winding 41a of the emergency relay 41f extends from the positive battery wire 34 (Fig. 1) by way of a branch wire 251, another wire 252, contact member j of master controller 14f, contact element 3 on the rotary drum 14d, contact member k, a wire 253, magnet winding 41a and a branch wire 254 to the negative battery wire 35. Contact members a and b of the relay 41f are accordingly actuated to circuit-closed position upon energization of the winding 41a but without effect until the rotary drum 14d of the master controller 14f reaches the position designated "Braking 6."

With the rotary drum 14d of the master controller 14f in "braking 6" position, the contact element 6 thereon connects the contact members r and s of the master controller and establishes a circuit for energizing the lower winding 41b of the emergency relay 41r at the rear control station. This circuit extends from the positive battery wire 34 (Fig. 1) by way of the branch wire 251, wire 252, contact member a of relay 41f, a wire 255, branch wire 256, contact member s, contact element 6, contact member r, a wire 257, control switch 61f in its lower position, a wire 258, switch 209 of the master reverser 15f, a wire 259, coupler switch 31f, a branch wire 260 of the reverser train wire 31, train wire 31 to the rear control station, a branch wire 262, coupler switch 31r, a wire 263, switch 210 of the master reverser 15r, a wire 264, contact member o of the master controller 14r, contact element 4 of the master controller 14r, contact member n, a wire 265, magnet winding 41b of the relay 41r, and a branch wire 254a to the negative battery wire 35.

It should be apparent that the contact element 6 of the master controller 14f engages the contact members r and s before the magnet winding 41a of relay 41f is deenergized by the disengagement of the contact element 3 of the master controller 14f from its associated contact members j and k, so that the contact member a of the relay 41f is in closed position at the time the contact element 6 engages the contact members r and s, thereby enabling the energizing circuit just described to be completed. This action may be effected due to the inherent drop-out lag of the relay 41f or to a slight overlapping of the contact elements 3 and 6 of the master controller drum 14d.

When the emergency relay 41r is picked-up due to energization of the magnet winding 41b thereof, the actuation of the contact member a thereof to circuit-closed position establishes a holding circuit for maintaining the lower magnet winding 41b of the emergency relay 41f energized. This circuit extends from the positive battery wire 34 at the rear control station (Fig. 3) by way of a branch wire 251a, a wire 252a, contact member a of the relay 41r, a wire 255a, switch 208 of the master reverser 15r, a wire 268, coupler switch 44r, a branch wire 269 of the train wire 44, train wire 44 including successively on each car in series relation a track trip switch 46r, low pressure switch 271, conductor's switch 47, track trip switch 46f, to the front control station and thence by a branch wire 272, coupler switch 44f, a wire 273, switch 207 of the master reverser 14f, a wire 274, deadman switch 52f which the operator is holding closed, wires 275 and 276 contact member b of the relay 41f, a wire 277, contact member m of the master controller 14f, contact element 4 of the master controller 14f, contact member n, a wire 278, magnet winding 41b of the relay 41f, and branch wire 254 to the negative battery wire 35.

Briefly, therefore, it will be seen that emergency relay 41f at the front end control station must be energized or picked-up to cause energization of the emergency relay 41r at the rear end control station; and that relay 41r must remain picked-up in order to maintain the holding circuit for the emergency relay 41f energized. This interlocking of the two emergency relays 41f and 41r requires both of two train wires, in this instance the reverser wire 31 and the emergency wire 44, to be intact and complete. Thus in a multiple unit train the connection of the sections of the train wires between the units or cars must be properly effected or the relays 41f and 41r will not be simultaneously picked up.

The contact element 6 on the rotary drum 14d of master controller 14f is such as to engage the associated pair of contact members r and s in all positions of the master controller handle except "emergency," "handle-off" and "trip" positions. Thus the emergency relays 41f and 41r remain picked-up over the interlocking circuits previously described, as the master controller handle shifts from "braking 6" through the various other braking positions to "release-coasting" position and in all propulsion positions of the controller handle unless the circuits are interrupted by the various switch devices or a break-in-two of the train.

In order to further condition the equipment to enable the propulsion of the vehicle, the propulsion prevention relay 51f must be energized, that is picked-up, and this is effected by means of the door relay 53f being actuated into closed position in response to the closing of all door switches 58. The circuit for energizing the door relay 53f extends from the positive battery wire 34 at the rear end control station by way of branch wire 251a, another branch wire 284, switch 202 of the master reverser 15r, a wire 285, coupler switch 57r, a branch wire 286 to the train wire 57, thence by train wire 57 to the front end control station in series relation through the door switches 58 on the several units or cars, branch wire 286a, coupler switch 57f, a wire 285a, switch 201 of the master reverser 15f, a wire 287, magnet winding 53a of the door relay 53f, and branch wire 254 to the negative battery wire 35.

The resultant actuation of the contact member a of the door relay 53f to closed position completes the circuit for energizing the propulsion prevention relay 51f. This circuit extends from the positive battery wire 34 at the rear end control station (Fig. 3) by way of the branch wire 251a, a branch wire 288, switch 206 of the master reverser 15r, a wire 289, coupler switch 43r, a branch wire 291 to the train wire 43, thence through the train wire 43 and the series included brake release check switches 48 on all cars to the front end control station, a branch wire 291a, coupler switch 43f, a wire 289a, switch 205 of the master reverser 15f, a wire 292, speed switch 54f, a wire 293, contact member a of the door relay 53f, a wire 294, reset switch 62f in its upper position, a wire 295, magnet winding 51a of the propulsion prevention relay 51f and branch wire 254 to the negative battery wire 35.

Accordingly, with the emergency relays 41f and 41r as well as the propulsion prevention relay 51f picked-up in the manner just described, the positioning of the operating handle of the master controller 14f in "release-coasting" position establishes circuits for effecting energization of the relays 26 and 29 on each car as indicated in the chart on Fig. 4. The circuit for energizing the relays 26 and 29, extends from the positive battery wire 34 at the front end control station (Fig. 1) through branch wire 251, wire 252, contact member a of the relay 41f, wire 255, a branch wire 297, contact member i of the master controller 14f, to contact element l of the master controller f, and thence in two parallel branches to the relays. The one branch extends from the contact element l of the master controller 14f by way of contact member a of the master controller, a wire 299, contact member a of propulsion prevention relay 51f in its upper position, branch wire 16a, train wire 16, a branch wire 16b, magnet winding of the relay 26 and thence by a return wire 301 to the negative battery wire 35. The second branch extends from the contact element l of the master controller 14f by way of the contact member g of the master controller, a wire 302, contact member d of the propulsion prevention relay 51f in its upper position, branch wire 19a, train wire 19, a branch wire 19b, magnet winding of the relay 29 and wire 301 to the negative battery wire 35.

As previously described, the emergency wire 44 is connected to the positive battery wire 34 by the contact member a of emergency relay 41r at the rear end control station. Thus, when the relays 26 and 29 on each car are picked-up as just described, the contact finger 157 of the actuator 13 on the corresponding car is connected to the positive battery wire 34 by the circuit previously traced starting from the train wire 44. The actuator pistons 112 are accordingly shifted, in the manner previously described to the position shown so as to effect the corresponding positioning of the rotary drums of both the propulsion controller 11 and brake controller 12 in "release-coasting" position.

Referring now partly to Fig. 2 and partly to Fig. 5, it will be seen that with the rotary drums of the two controllers 11 and 12 on each car in "release-coasting" position, a circuit is established for closing the master circuit breaker 84 on each car. As seen in Fig. 5, this circuit extends from the positive terminal of the battery 38, by way of the wire 36, contact element 12a of the rotary drum of the brake controller 12, a wire 305, solenoid winding 84a of the circuit breaker 84 and wire 37 back to the negative terminal of the battery.

Upon the closing of the contact member 84b of the circuit breaker 84 in response to the energization of the solenoid 84a, a holding circuit for maintaining the solenoid 84a energized is completed and, at the same time, the latch member 216 cooperates with the lug 215 to maintain the contact members 84b and 84c in circuit-closing position. The holding circuit for the solenoid 84a extends from the positive terminal of the battery 38 by way of the wire 36, contact member 84b of the circuit breaker, contact member 229 on the trip plunger 219, wire 305, solenoid 84a and wire 37 back to the negative terminal of the battery 38.

The closing of the contact member 84c connects the positive terminal of the battery 38 to a wire 306 but this is without effect at this time.

As will be apparent in both Figs. 2 and 5, the emergency application relay 83 and the magnet winding 235 of the by-pass magnet valve 91 are connected in parallel relation between the train wire 44 and the negative terminal of the battery 38 and are both accordingly energized because the wire 44 is connected to the positive battery wire in the manner previously described. The relay 83 is accordingly in circuit-open position and the by-pass magnet valve 91 is conditioned so that fluid under pressure may be supplied to the brake cylinders under the control of the brake valve 88.

(b) Propulsion

Assuming now that the equipment is conditioned as previously described, the operator may initiate the propulsion of the train by shifting the operating handle of the master controller 14f out of "release-coasting" position to a desired accelerating position according to the desired degree of acceleration. It will be understood that, although not shown, the rotary drum 11d of the propulsion controller 11 on each car is adapted to automatically control the rate of acceleration of the car motors 64, 65, 66 and 67 according to the degree of displacement of the rotary drum out of "release-coasting" position. Thus, in accelerating position 1, the lowest rate of acceleration is attained, and in accelerating position 4, the highest rate of acceleration is attained.

Assuming, therefore, that the operator selects propulsion position designated "Accelerating 2" and shifts the operating handle of the master controller 14f to such position, the selector relays 26, 27 and 28 are simultaneously energized as indicated in the chart in Fig. 4.

These circuits need not be individually traced as it will be apparent that, with the contact member $i$ of the master controller 14$f$ connected to the positive battery wire 34 through the contact member $a$ of the emergency relay 41$f$ as previously described, the engagement of the contact element 1 of the master controller 14$f$ with the contact members $a$, $c$, and $e$ of the master controller causes energization of the train wires 16, 17 and 18 so that the relays 26, 27 and 28 are correspondingly energized on each unit or car.

Remembering that the train wire 44 is connected to the positive battery wire 34 at the rear end control station in the manner previously described, it will be seen that the energization of relays 26, 27 and 28 on each car establishes selectively a circuit for connecting the contact finger 160 of the actuator 13 on the corresponding car to the wire 44 and thus to the positive battery wire 34. This circuit extends, beginning at the train wire 44 in Fig. 2, by way of the wires 175 and 176, contact member 29$a$ of the relay 29 in its lower position, wire 308, contact member 28$b$ of the relay 28 in its upper position, a wire 309, contact member 27$c$ of the relay 27 in its upper position, a wire 311, contact member 26$e$ of the relay 26 in its upper position, and a wire 312 to the contact finger 160.

With the contact finger 160 of the actuator 13 thus connected to the positive battery wire 34, the magnet valves 121 and 122 of the actuator 13 are controlled, in a manner similar to that previously described, so as to cause shifting of the pistons 112 in the right-hand direction and to cause them to stop when the short contact segment 164 engages the contact finger 160. The operating arm 101 of the propulsion controller 11 is correspondingly shifted in a clockwise direction in Fig. 2 and the rotary drum 11$d$ is shifted in the right-hand direction as indicated by the arrow in Fig. 5. The contact element 11$a$ on the rotary drum 11$d$ of the propulsion controller 11 is thus shifted into circuit-closing contact with its associated pair of contact members to complete a circuit for energizing the propulsion relays 68 and 69. This circuit extends from the train wire 44 (Fig. 5) by way of the branch wire 175, another wire 314, contact element 11$a$ on the rotary drum of the propulsion controller 11, a wire 315, contact element 12$c$ of the rotary drum of the brake controller 12, which it will be recalled remains in "release-coasting" position, a wire 316, in parallel through the magnet windings 68$a$ and 69$a$ of the relays 68 and 69 respectively, contact member $a$ of the overload relay 71, a wire 317, contact member $a$ of the dynamic braking relay 72, to the negative terminal of the battery 38 as by a ground connection in the manner shown.

The contact member $a$ of each of the propulsion relays 68 and 69 is accordingly actuated to closed position to establish a circuit for supplying propulsion current to the car motors from an external source such as a trolley wire 318 (Fig. 5). The circuit whereby propulsion current is supplied to drive the car motors 64 to 67 extends from the trolley wire 318 by way of the trolley pole 319 and wire 320, contact member $a$ of the relay 68, magnet winding 71$a$ of the overload relay 71, a wire 321, thence in series-parallel relation through the motor armatures 64$a$, 65$a$, 66$a$ and 67$a$ and the motor field windings 64$f$, 65$f$, 66$f$ and 67$f$ in manner shown, thereafter rejoining and extending by way of the contact member $a$ of the relay 69, wire 322, rheostat 73 and back to the external source as by the ground connection indicated.

It will be understood that the rheostat 73 is automatically controlled and operated in conventional manner to provide the desired rate of acceleration corresponding to the accelerating position 2 of the propulsion controller 11.

Ultimately the maximum amount of resistance of the rheostat 73 is cut out and thereafter the multiple unit train is propelled at a substantially constant speed in accordance with the design and characteristics of propulsion motors 64 and 67.

If the operator desires to have the train coast, he may do so by merely shifting the operating handle of the master controller back to "release-coasting" position from the accelerating position. The propulsion controller 11 is correspondingly returned to "release-coasting" position in which the contact element 11$a$ interrupts the circuit for energizing the propulsion relays 68 and 69. The relays 68 and 69 are accordingly deenergized and the contact members $a$ thereof are returned to circuit-open position so that the propulsion current supplied to the motors is accordingly interrupted and the train accordingly is permitted to coast.

In the previous description, it was assumed that the master reverser 15$f$ at the front end control station is in "forward" position and that the reverser wire 31 was correspondingly energized. Thus, in the assumed operation, the reverser coil 21$f$, which is connected between the reverser wire 31 and the negative terminal of the battery 38 as through a ground connection in the manner shown, is energized to correspondingly establish conventional connections, not shown, in the motor control system whereby the car motors will rotate in such direction as to propel the train in a forward direction.

If the operator desires to cause the train to travel in a reverse direction, it is necessary for him to remove the operating handle of the master controller 14$f$ and employ it to shift the master reverser 15$f$ from "forward" to "reverse" position. In such case the brakes will be applied and the train will be brought to a stop in the manner hereinafter to be described. Because the operating handle of the master controller can be removed only in the "handle-off" position, it is impossible for the operator to change the position of the master reverser except when the car or train is stopped and the brakes applied.

Assuming, therefore, that the operator desires to reverse the direction of travel of the train, he employs the master controller handle to operate the master reverser from "forward" to "reverse" position and then returns the handle to the master controller.

When the operating handle of the master controller 14$f$ is shifted from "handle-off" position to "release-coasting" position at this time, the emergency relays 41$f$ and 41$r$ are both simultaneously energized in a manner similar to that described for the "forward" position of the master reverser 15$f$, except that the contact member $a$ of the relay 41$f$ establishes a circuit for energizing the upper magnet winding 41$a$ of the emergency relay 41$r$ over the reverser wire 32.

This circuit may be traced from the battery wire 34 at the front end control station (Fig. 1) through branch wire 251, wire 252, contact member $a$ of the emergency relay 41$f$, wires 255 and 256, contact member $s$ to contact member $r$ through contact element 6 of the rotary drum 14d of the master controller 14f, wire 257, control switch 61f in its lower position, wire 258, switch 211 of the master reverser 15f, the wire 331, coupler switch 32f, a wire 332 to the wire 32, thence over the wire 32 to the rear end control station, through a branch wire 332a, coupler switch 32r, a wire 331a, switch 212 of the master reverser 15r, a wire 333, contact members l and k of the master controller 14r which are connected by the contact element 3 on the master controller drum 14d, a wire 334, upper magnet winding 41a of the emergency relay 41r, and wire 254a to the negative battery wire 35.

The emergency relay 41r is thus picked-up and the contact member a thereof actuated to closed position to complete the holding circuit, previously described, for energizing the lower magnet winding 41b of the emergency relay 41f at the front end control station.

With the reverser train wire 32 thus energized, the reverser coil 21r of the reverser 21 is correspondingly energized and establishes suitable connections for reversing the flow of propulsion current through the armature windings or the field windings of the motors 64 to 67 so that upon the operation of the propulsion relays 68 and 69 to complete the propulsion circuit, the direction of rotation of the motors is such as to drive the train in a reverse direction.

If the operator desires to accelerate the train at a low rate and to cause it to travel at a low speed, he operates the master controller 14f to "switching" position. In the "switching" position of the master controller, the selector relays 28 and 29 on each car or unit are energized as indicated in the chart of Fig. 4. Thus, the contact finger 158 of the actuator 13 is connected to the train wire 44 by way of the wires 175 and 176, contact member 29a of relay 29 in its upper position, wire 177, contact member 28a of the relay 28 in its upper position, a wire 336, contact member 27a of the relay 27 in its lower position, a wire 337, contact member 26b of relay 26 in its lower position, and a wire 338. The magnet valves 121 and 122 of the actuator 13 are accordingly controlled automatically so as to cause shifting of the actuator pistons 112 to a position such that the short contact segment 164 engages the contact finger 158, correspondingly positioning the rotary drum of the propulsion controller 11 in "switching" position.

As will be seen in Fig. 5, the contact element 11a on the rotary drum of the propulsion controller 11 accordingly engages its associated contact members to complete the circuit for energizing the propulsion relays 68 and 69. Furthermore, the rotary drum of the propulsion controller is so adapted in manner not shown that in "switching" position it causes acceleration of the car motors at a low rate, the direction of movement of the train depending upon whether the master reverser 15f is in the "forward" or "reverse" position.

(c) *Reset operation*

If for some reason, the propulsion current supplied to the car motors becomes excessive, due possibly to a ground on or short-circuit in an armature or field winding of the motors during the propulsion of the train, the overload relay 71 is picked-up and latched in its upper position. Before being able to proceed further, it is necessary for the operator to reset the overload relay 71.

In order to reset the overload relay 71, the operator depresses the reset switch 62f at the front end control station. As indicated in the chart on Fig. 4 for the reset position, the controller handle of the master controller 14f may remain in the propulsion position in which it happens to be at the time the overload relay is picked-up because, as will be presently described, the actuator 13 is automatically operated to "release-coasting" position independently of the position of the master controller handle, upon the depression of the reset switch 62f.

When the reset switch is shifted from its upper position, it interrupts the circuit, previously traced, for energizing the winding 51a of the propulsion prevention relay 51f and the contact members of this relay accordingly drop to their respective lower positions. The configuration of the contact element 1 of the rotary drum 14d of the master controller 14 is such in relation to the associated stationary contact members a to i inclusive that when the propulsion relay 51f is de-energized and the contact members a to d thereof drop to their lower positions, it is impossible to establish the necessary connections for energizing those combinations of the relays 26 to 29 for causing operation of the actuator 13 to shift the brake controller 11 to a propulsion position.

Assuming that the handle of the master controller is in any propulsion position at the time the overload relay 71 operates to interrupt to supply of propulsion current to the car motors and is permitted to remain therein. The dropout of the propulsion prevention relay 51f automatically causes the train wires 16 and 19 to be energized due to the fact that contact segment 1 on the controller drum engages only such of the associated contact members as to establish a circuit to wires 16 and 19 through contact members a and d of the propulsion prevention relay 51f.

The previously traced circuit through the contact members of relays 26 to 29 for energizing the "release-coasting" position contact finger 157 of actuator 13 cannot be established at this time, however, because the relay 27 is also energized due to the shifting of the reset switch 62f to its lower position. The circuit for energizing the relay 27 extends from the positive battery wire 34 at the front end control station by way of the branch wire 251, wire 252, contact member a of the emergency relay 41f, wires 255 and 256, contact members s and r connected by the contact element 6 of the master controller 14f, wire 257, control switch 61f, wire 258, a branch wire 341, reset switch 62f in its lower position, wires 342 and 343, contact members q and p connected by the contact element 5 on the rotary drum 14d of the master controller 14f, a wire 345, a wire 346, contact member b of propulsion prevention relay 51f in its lower position, branch wire 17a, train wire 17, and thence in parallel through the magnet windings of all the relays 27 on each car to the negative battery wire 35.

With the three relays 26, 27 and 29 thus energized, the contact finger 157 corresponding to "release-coasting" position is connected to the energized train wire 44 by way of the wires 175 and 176, contact member 29a of relay 29 in its upper position, wire 177, contact member 28a of relay 28 in its lower position, wire 178, branch wire 347 of the wire 178, contact member 27e of the relay 27 in its upper position, a wire 348, contact member 26h of the relay 26 in its upper position, a wire 349 and the wire 181. Thus the actuator 13 automatically restores the propulsion controller 11 to "release-coasting" position notwithstanding that the handle of the master controller 14f remains in a propulsion position and is not shifted to its "release-coasting" position.

With the three relays 26, 27 and 29 energized as just described, a circuit is also established for energizing the reset coil 228 of the overload relay 71, this circuit extending from the positively energized train wire 44 by way of the wires 175 and 176, contact member 29a of relay 29 in its upper position, wire 177, contact 28a of relay 28 in its lower position, wire 178, contact member 27b of the relay 27 in its upper position, a wire 351, contact member 26c of the relay 26 in its upper position, a wire 352, contact element 12f of the rotary drum of the brake controller 12 in "release-coasting" position, wire 353, and continuing only in Fig. 5, by way of contact member b of the overload relay 71 which is latched in its upper position, a wire 354, reset coil 228 of the overload relay 71, and to the negative terminal of the battery 38 as by a ground connection in the manner shown. Energization of the reset coil 228 of the overload relay 271 causes withdrawal of the latch member 226 and the consequent restoration of the overload relay 71 to its normal lower position in which the contact member a thereof is in closed position permitting the energization of the propulsion relays 68 and 69.

The operator now releases the reset switch 62f and permits it to return to its upper position so that the energizing circuit for the reset coil 228 of the overload relay 71 is interrupted both by the shifting of the contact member b of the overload relay 71 to its open position and by the interruption of the circuit at the reset switch 62f. Upon the restoration of the reset switch 62f to its upper position, the circuit for energizing the propulsion prevention relay 51f is restored and the relay contact members a to d are accordingly shifted to their respective upper positions.

With the operating handle of the master controller 14f remaining in a propulsion position, the operation is now just the same as if the operator had shifted the operating handle from "release-coasting" position to a propulsion position. It will thus be seen that the equipment comprising my invention automatically prevents the restoration of the propulsion circuit in a manner other than the normal manner and prevents the supply of excessive propulsion current to the propulsion motors due to leaving the operating handle of the master controller in a propulsion position during the reset operation.

(d) *Safety features in propulsion*

The various safety features provided automatically effect deenergization of the propulsion prevention relay 51f to prevent the supply of propulsion current to the car motors under certain circumstances.

For example, if any one or all of the doors on the car are not properly closed, the corresponding door switches 58 interrupt the circuit through the train wire 57 and consequently the circuit for energizing the door relay 53f at the front end control station. The contact member a of the door relay 51f will thus be in open position interrupting the energizing circuit of the propulsion prevention relay 51f. Consequently, as previously explained, it will be impossible for the operator to cause operation of the actuator 13 and the resultant movement of the propulsion controller 11 out of "release-coasting" position until all of the doors are properly closed.

Another protective feature is the brake release check switch 48 on each car contained in series relation in the train wire 43, which switch is adapted to remain in open position preventing energization of the propulsion prevention relay 51f in the event that the friction brakes associated with the car wheels remain stuck in application position. Thus the operator cannot cause propulsion of the vehicle with a friction wheel brake locked in application position.

Another protective feature is the speed switch 54f which is adapted to open whenever the rotative speed of the car motor armatures exceeds a certain speed corresponding, for example, to a vehicle speed of forty miles per hour. The opening of the speed switch 54f interrupts the energizing circuit for the propulsion prevention relay 51f and thus causes the actuator 13 to be automatically operated to restore the propulsion controller 11 to "release-coasting" position, thereby preventing the supply of propulsion current to the car motors. The primary purpose of the speed switch 54f is to limit to a certain extent the speed of the train on a down grade by preventing the supply of propulsion power to the motors whenever the speed of the train exceeds a certain speed.

(e) *Application of the brakes*

Let it be assumed now that the train is being driven under power in the manner previously described and that it is desired to effect an application of the brakes. As will be apparent, it is necessary for the operator to shift the operating handle of the master controller 14f back through "release-coasting" position, thus automatically causing the propulsion controller 11 to be restored to "release-coasting" position before the operating handle of the master controller can be shifted to a braking position.

Assuming that the operator shifts the operating handle of the master controller 14f to an intermediate braking position, such as "braking 4", it will be seen, as indicated in the chart of Fig. 4, that only the train wire 19, and thus the relay 29 on each of the cars is accordingly energized. The circuit for connecting the corresponding contact finger 154 of the actuator 13 to positively energized train wire 44 is thus established by way of the wires 175 and 176, contact member 29a in its upper position, wire 177, contact 28a of relay 28 in its lower position, wire 178, contact member 27b of relay 27 in its lower position, wire 179, contact member 26d of relay 26 in its lower position, and wire 357. The magnet valves 121 and 122 of the actuator 13 are thus controlled automatically, in the manner similar to that previously described, to cause the actuator pistons 112 to be shifted to and stopped in the position in which the short contact segment 164 engages the contact finger 154, thus correspondingly shifting the rotary drum of the brake controller 12 to the corresponding position while the rotary drum of the propulsion controller remains in its "release-coasting" position.

At the same time, the operating shaft 89 of the brake valve 88 is correspondingly rotated and fluid under pressure is supplied by the brake valve from the reservoir 87 to the pipe 231, then to the by-pass magnet valve 91 and through to the pipe 237 leading to the suppression magnet valve 93, which as will presently appear is energized by dynamic braking current and prevents the fluid under pressure from being supplied to the brake cylinders 86.

Referring to Fig. 5, the manner in which the brake controller 12 effects application of the magnetic track brake devices 75 and establishes connections for causing the car motors 64 to 67 to act as dynamic brakes will now be described.

When the rotary drum of the brake controller 12 is shifted out of "release-coasting" position in the direction indicated by the arrow in Fig. 5, the stepped contact element 12b on the rotary drum 12d first engages a pair of associated stationary contact members and establishes a circuit for energizing the electromagnet windings 77 of the magnetic track brake devices 75. At the same time, the contact element 12e on the rotary drum 12d engages a pair of associated contact members and establishes a circuit for energizing the dynamic braking relay 72.

The circuit for energizing the magnetic track brake devices 75 may be traced in Fig. 5 from the positive terminal of the battery 38 by way of the wire 36, contact member 84c of the master circuit breaker 84 to the wire 396, and thence by way of the contact element 12b of the brake controller, wire 359, through all of the resistor 82 to a wire 361, and thence in parallel relation through the electromagnet windings 77 of the several track brake devices 75, to the negative terminal of the battery 38 as through a ground connection in the manner shown.

When the rotary drum 12d of the brake controller 12 is shifted beyond the brake application position designated "Braking 1" and to the application position designated "Braking 2," the contact element 12b on the controller drum engages another stationary contact member associated therewith and shunts out a portion 82a of the resistor 82, thereby effecting an increase in the energizing current supplied to the electromagnet windings 77. This condition is not changed as the rotary drum 12d of the brake controller 12 is shifted into the brake positions 3 and 4.

It will be understood that the arrangement of the contact element 12b of the rotary drum brake controller 12 is merely illustrative and that any desired variation of the amount of the resistor 82 contained in the energizing circuit for the electromagnet windings 77 may be effected by rotary displacement of the brake controller drum out of its normal or "release-coasting" position.

In any event, the initial current supplied to the electromagnet windings 77 is sufficient to magnetically attract the brake shoe devices 75 into frictional engagement with the track rails associated therewith so as to cause retardation of the vehicle or train.

The circuit for energizing the dynamic braking relay 72 may be traced in Fig. 5 from the positive terminal of the battery 38 to the wire 306 as previously indicated thence by wires 362 and 363, contact member b of propulsion relay 68, wire 364, electromagnet winding 72a of the dynamic braking relay 72, wire 365, contact member b of the propulsion relay 69, a wire 366, contact element 12e on the rotary drum of the brake controller 12, a wire 367, contact element 11b on the rotary drum of the propulsion controller 11, to the negative terminal of the battery 38 as through a ground connection in the manner shown.

Upon the energization of the magnet winding of the dynamic braking relay 72, contact member a of the relay is shifted to open position, thus preventing the energization of the propulsion relays 68 and 69, and the contact members b and c of the relay are shifted to closed positions establishing the dynamic braking circuit for motors 64 to 67. The dynamic braking circuit for the motors may be traced from the common terminal of the motor armature 65a and the field winding 65f by way of a wire 371, contact member b of dynamic braking relay 72, a wire 372 connected to one terminal of the rheostat 73, through the resistor of the rheostat and the movable contact member thereof to a wire 373, thence by contact member c of dynamic braking relay 72, wire 374, through the electromagnet winding 244 of suppression magnet valve 93, a wire 375 to the common terminal of the motor armature 66a and field winding 66f, the circuits then extending through two parallel branches back to the starting point, the one branch including in series relation field windings 66f and 67f, motor armatures 64a and 65a, and the second branch including in series relation the motor armatures 66a and 67a and field windings 64f and 65f.

As previously stated, it will be understood that the degree of displacement of the rotary drum of the brake controller 12 out of "release-coasting" position automatically controls in conventional manner the operation of the rheostat 73 so as to correspondingly control the degree of dynamic braking current and consequently the degree of dynamic braking effect on the train.

Assuming that the speed of travel of the train is high enough that the dynamic braking current in the circuit just traced is sufficient to cause the suppression magnet valve 93 to prevent the supply of fluid under pressure to the brake cylinders 86, it will be seen that in the assumed instance, the magnetic track brake devices 75 and the car motors functioning as dynamic brakes initially operate to brake the cars.

As the speed of the train decreases due to the application of the dynamic and magnetic track brakes, and reduces below some certain low speed, such as ten miles per hour, the dynamic braking current will correspondingly decrease to a value which is insufficient to cause the suppression magnet valve 93 to continue to prevent the supply of fluid under pressure to the brake cylinders and, accordingly, the magnet valve 93 will operate to permit the fluid under pressure to be supplied to the brake cylinders under the control of the brake valve 88, the ultimate degree of pressure established in the brake cylinders corresponding to the degree of rotary displacement of the operating shaft 89 of the brake valve 88 out of its normal position.

As the train comes to a stop, therefore, the dynamic braking effect becomes zero and the train is held in a stopped position by the application of the fluid pressure brakes.

The electromagnet windings 77 of the magnetic track brake devices 75 are suitably designed so that energizing current may continue to be supplied thereto until such time as the master controller handle is shifted to "release-coasting" position. If desired, suitable automatic circuit interrupting means (not shown) may be provided for interrupting the circuit of the electromagnet windings 77, as the train comes to a stop, to prevent the undesired consumption of current and the consequent drain on the battery 38.

When the doors on one or more cars are opened while the train is stopped, the door relay 53f at the front end control station is deenergized and this, of course, results in deenergization of the propulsion prevention relay 51f which accordingly prevents propulsion of the train. The drop-out of the propulsion prevention relay is without effect as far as affecting the application of the brakes because contact element 1 on the rotary drum of the master controller 14f is so designed that it causes energization of the same train wire or wires, for any braking position of the master controller whether the propulsion prevention relay 51f is energized or deenergized.

When the operator desires to release the brakes prior to again starting the train, he merely moves the operating handle of the master controller 14f to "release-coasting" position. The actuator 13 on each car is accordingly automatically operated to restore the brake controller 12 on each car to "release-coasting" position, thereby interrupting the circuits for energizing the electromagnet windings 77 of the magnetic track brake devices 75 (if not previously interrupted as just indicated) and the circuit for the dynamic braking relay 72.

Upon the return of the brake controller 12 to its "release-coasting" position, the operating shaft 89 of the brake valve 88 is correspondingly returned to its normal position and fluid under pressure is accordingly released from the brake cylinders reversely through the suppression magnet valve 93 and by-pass magnet valve 91 to the brake valve 88 where it is vented to atmosphere through the exhaust port thereof.

It will be apparent that the operator may vary the degree of application of the brakes as desired by selecting any one of the braking positions of the operating handle of the master controller so as to position the brake controller 12 on each car correspondingly and thus control the degree of application of the dynamic brakes, the magnetic track brakes and the fluid pressure brakes.

To effect an emergency application of the brakes, the operator shifts the operating handle of the master controller 14f to "emergency" position. As indicated by the chart of Fig. 4, all of the selector relays 26 to 29 are deenergized in the "emergency" position of the master controller. This is so because contact element 1 on the rotary drum of the master controller 14f disengages all of its associated contact members a to i. Thus although the emergency relay 41f remains picked-up due to energization of the upper winding 41a thereof and contact member i of the master controller 14f is connected through contact member a of relay 41f to the positive battery wire, the train wires 16 to 19 are all deenergized. At the same time, with the master controller 14f in "emergency" position, the contact element 6 on the rotary drum thereof disengages its associated pair of contact members r and s. Thus, notwithstanding that the upper magnet winding 41a of the emergency relay 41f is energized and the relay contact members a and b actuated to closed position, the circuit for energizing the upper or the lower magnet winding 41a and 41b of the emergency relay 41r at the rear end control station, depending upon which is effective, is interrupted. Consequently, due to the opening of the contact member a of the emergency relay 41r, the previously described connection between the positive battery wire 34 and the emergency wire 44 at the rear end control station is interrupted.

Thus, when the master controller handle is operated to "emergency" position, all of the selector relays 26 to 29 are deenergized and, at the same time, the emergency wire 44 is disconnected from the positive battery wire 34, that is, it is deenergized. It will be seen, therefore, that due either to the deenergization of all the selector relays or to the deenergization of the emergency wire 44, none of the contact fingers 151 to 162 of the actuator 13 on each car is energized. In the case of the selector relays 26 to 29, the contact members thereof are so disposed and arranged that no circuits are established therethrough from the emergency wire 44 to any of the contact fingers when all of the relays are deenergized. The fact that the emergency wire 44 is also deenergized serves as a safety feature to insure that all of the contact fingers of the actuators 13 are deenergized in the event that one or more of the relays 26 to 29 should fail to drop out upon deenergization.

With none of the contact fingers of the actuator 13 on each car energized, the magnet valves 121 and 122 of each actuator are correspondingly deenergized and fluid under pressure is accordingly supplied only to the piston chamber associated with the right-hand piston 112 of the actuator. The pistons 112 are thus shifted a maximum degree in the left-hand direction, that is, to a position in which the left-hand piston 112 engages the end wall of the casing 111. With the actuator pistons so positioned, the rotary drum of the brake controller 12 is displaced beyond the last service application position, designated "Braking 6," to the "emergency" position thereof.

With the rotary drum of the brake controller 12 thus shifted to "emergency" position, the contact element 12a thereon disengages its associated pair of contact members. Such disengagement is without effect because the master circuit breaker 84 is latched in its circuit-closing position and is also held therein by a holding circuit, as previously described, independently of the engagement of the contact element 12a with its associated contact members.

The contact element 12e on the rotary drum of the brake controller 12 engages its associated pair of contact members in the "emergency" position of the controller drum and thus establishes the energizing circuit for the dynamic braking relay 72 in the manner previously described, it being understood, however, that due to the degree of displacement of the rotary drum from the "release-coasting" position, the rheostat 73 is controlled suitably so as to effect a maximum degree of dynamic braking effect.

Due to the deenergization of the emergency wire 44, the application of the magnetic track brake devices 75 and the supply of fluid under pressure to the brake cylinders 86 is effected in a different manner from that during a service application. This is brought about by the deenergization of the emergency application relay 83 and of the magnet winding 235 of the by-pass magnet valve 91 on each car resulting from deenergization of the emergency wire 44.

As a result of the deenergization of the emergency application relay 83, a circuit is established independently of the brake controller 12 for energizing the electromagnet windings 77 of the magnetic track brake devices 75. As seen in Fig. 5, this circuit may be traced from the positive terminal of the battery 38 through contact member 84c of the master circuit breaker 84 to the wire 306, thence by wire 362, contact members of the emergency application relay 83, a wire 385 to the wire 361, and in parallel relation through the electromagnet windings 77 of the magnetic track brake devices 75 to the negative terminal of the battery 38 as through a ground connection in the manner shown. It will be observed that the connection between the wire 306 and the wire 361 established by the emergency application relay 83 shunts or by-passes the circuit through the brake controller 12 and the resistor 82. Thus the electromagnet windings 77 are energized to a maximum degree so as to cause a maximum retarding effect to be exerted by the track brake devices 75.

Upon the deenergization of the magnet winding 235 of the by-pass magnet valve 91 on each car, the double beat valve 232 is shifted to its right-hand seated position and fluid under pressure is accordingly supplied directly from the reservoir 67 to the pipe 237 leading to the suppression magnet valve 93, independently of the brake valve 88.

As in the case of a service application of the brakes, the suppression magnet valve 93 is effective to prevent the supply of fluid under pressure to the brake cylinders 86 as long as the dynamic braking current energizing the magnet winding 244 thereof is sufficient to hold the double beat valve 242 in its left-hand seated position. When the dynamic braking current reduces sufficiently, the double beat valve 242 is shifted to its right-hand seated position and fluid under pressure is thereupon admitted to the brake cylinders 86, the pressure ultimately established in the brake cylinder being a maximum due to the direct supply of fluid under pressure from the reservoir 87, independently of the brake valve 88.

The release of the brakes, following an emergency application, is effected in the same manner as for a service application, that is, by returning the operating handle of the master controller 14f to "release-coasting" position.

An emergency application of the brakes may be effected in various other ways, for example, by the operator releasing the deadman switch 52f so as to cause it to return to open position, by the operation of any of the track trip switches 46f or 46r on any of the cars, by the operation of any of the conductor's switches 47 on any of the cars, or by accidental parting or break-in-two of a train.

In all of the above cases, the result of opening of the various switches or of the break-in-two is the interruption of the energizing circuit for the emergency relay 41r as well as the interruption of the holding circuit for the emergency relay 41f. Both emergency relays 41f and 41r are thus deenergized or dropped-out.

Accordingly, if a train is traveling along under power, with the handle of the master controller in one of its propulsion positions, the drop-out of both of the emergency relays 41f and 41r as just described automatically results in an emergency application of the brakes being effected just as in the case of operation of the handle of the master controller to "emergency" position.

In the case of a break-in-two of a train, caused by accidental parting of the coupler between two cars or by breaking or tearing of a coupler from a car, an emergency application is, of course, effected on each individual section of the parted train.

Thus, in a three-car train, if the coupler between the first and second cars is torn or broken off the second car, the consequent interruption of the train reverser wires 31 or 32 and emergency wire 44 causes the emergency relays 41f and 41r on the first car to be simultaneously deenergized. This is so because whether the coupler switches 31r, 32r, 43r, 44r and 57r on the first car remain open or closed as a result of the break-in-two, the holding circuit for emergency relay 41f is interrupted and the relay drops-out to cause deenergization of emergency relay 41r before the coupler switches can close, if they do close.

The emergency relay 41f at the front end control station of the second car is of course deenergized, and remains so, because the coupler switches on the front end of the second car are torn from the train wires and the circuits therethrough are opened and also because the master controller 14f thereon is in "handle-off" position. Consequently, the emergency relay 41f on the second car and the emergency relay 41r at the rear control station of the third car are simultaneously dropped-out. The relays 26 to 29 on all cars are thus deenergized simultaneously and train reverser wires 31 or 32 and emergency wire 44 remain deenergized so that an emergency application on all cars is effected.

If the coupler between the first and second car separates accidentally in normal manner of operation so as to close the coupler switches at the rear end of the first car and at the front end of the second car, nevertheless, an emergency application on all cars is effected. It will be understood that the momentary open condition of the coupler switches between the first and second car will interrupt the circuit through the train wires 31 or 32 and 44 on all cars. Thus, in the case of the first car, the subsequent closing of the coupler switches at the rear end thereof will not be effective to reclose the circuits through wires 31 or 32 and 44 because the holding circuit for lower magnet winding 41b of emergency relay 41 is interrupted before the coupler switches at the rear end of the first car can close. Thus the closing of the coupler switches at the rear end of the first car cannot reestablish the circuits and pick-up both emergency relays 41f and 41r on the first car. Unless the handle of the master controller is first shifted to "handle-off" position and then back to its original position at the time of the parting, the relays 41f and 41r on the first car remain dropped-out after parting of the first and second car coupler parts and an emergency application on the first car of course results.

In the case of the second and third cars, the closing of the coupler switches at the front end of the second car cannot reestablish the circuits for picking up both the emergency relays 41f and 41r thereon due to the handle of the master controller 14f on the second car remaining in "handle-off" position. Thus, wires 31 or 32 and 44 on the second and third cars will not be energized and an emergency application therefore results on the second and third cars.

(f) Emergency suppression feature

If the operator has effected a service application of the brakes by operation of the master controller 14f so that the train has been brought to a stop, and desires to remove his foot from the deadman switch 52f, he may do so without effecting an emergency application of the brakes if a sufficient degree of pressure has been established in the brake cylinders 86 to close the pressure switch 94f. With switch 94f closed, the deadman switch 52f is shunted or by-passed and thus the holding circuit for the lower magnet winding 41b of the emergency relay 41f is maintained notwithstanding the opening of the deadman switch 52f.

(g) Changing control stations

If the operator desires to change from the front end control station to the rear end control station, he first removes the operating handle of the master controller 14f so that the rotary drum thereof is automatically shifted to "handle-off" position. As previously described in connection with the conditioning of the control equipment, the contact element 6 on the rotary drum 14d of the master controller 14f does not engage the contact members r and s of the master controller in the "handle-off" position. Consequently, the circuit previously traced for energizing the lower magnet winding 41b of the emergency relay 41r at the rear end control station is automatically interrupted and the emergency relay 41r dropped out. The opening of the contact member a of the emergency relay 41r consequently interrupts the connection from the positive battery wire 34 to the train wire 44 at the rear end control station and thus the battery supply to all contact fingers of the actuator 13 on each car is interrupted the same as in an emergency application of the brakes. Furthermore, just as in an emergency application of the brakes, the contact element 1 on the rotary drum 14d of the master controller 14f disengages the contact members a to i inclusive of the master controller 14f and consequently none of the train wires 16, 17, 18 and 19 are energized by connection to the positive battery wire 34 at the front end control station. Accordingly, due both to the deenergization of all of the relays 26, 27, 28 and 29 and the deenergization of the train wire 44, all of the contact fingers 151 to 162 of the actuator 13 are deenergized and consequently the actuator 13 operates the brake controller 12 to its "emergency" position. An emergency application of the brakes is thus effected in the same manner as just described in connection with the interruption of the train wire 44 by any of the various switch devices.

In this instance, however, the train is stopped and there is therefore no dynamic braking current to operate suppression magnet 93 to prevent the supply of fluid under pressure to the brake cylinders 86. Fluid under pressure is thus immediately supplied directly from the reservoir 87 to the brake cylinders 86, independently of the brake valve 88, without dynamic braking.

Before proceeding to the rear end control station, the operator first operates the control switch 61f to its upper position and employs the operating handle of the master controller to shift the master reverser 15f to "off" position but, since the emergency relay 41r at the rear end of the control station is already dropped-out, such operations are without any instant effect.

The operator then proceeds to the rear end control station where he operates the control switch 61r to its lower position and employs the handle of the master controller to shift the master reverser 15r at the rear end control station to "forward" or "reverse" position, as he might choose, and then installs the handle on the master controller 14r.

The shifting of the handle to the "release-coasting" position of the master controller 14r is then effective to control the actuator 13 on all cars so as to cause operation of the brake controllers 12 to the corresponding "release-coasting" position to effect the release of the brakes prior to again starting the train. The operation of the equipment with the operator stationed at the rear end control station is entirely similar to that previously described with the operator at the front end control station, the circuits being readily apparent from those previously traced. It is deemed unnecessary, therefore, to describe the operation of the equipment with the operator stationed at the rear end control station.

(h) "Trip" operation

Let it now be assumed that the operator has brought the train into a storage barn where he desires to leave it. In such case, before removing the operating handle of the master controller 14f he shifts it past the "handle-off" position to "trip" position and then back to "handle-off" position where it is removed.

The operation of the handle of the master controller 14f to "trip" position causes energization of all of the train wires 16, 17, 18 and 19 by connection through contact element 2 on the master controller drum and contact member a of emergency relay 41f to the positive battery wire 34 at the front end control station. Assuming that the propulsion prevention relay 51f remains energized, it will be seen that the contact element 2 on the rotary drum 14d of the master controller 14f connects the contact member i of the master controller to the contact members a, c, e, and g of the master controller simultaneously and thus with the positive battery wire 34 connected to the contact member i through the contact member a of the emergency relay 41f, in the manner previously described, it will be seen that all of the train wires 16, 17, 18 and 19 are connected to the positive battery wire 34 at the front end control station.

Accordingly, with all of the train wires 16, 17, 18 and 19 so connected to the positive battery wire 34, all of the relays 26, 27, 28 and 29 on each of the cars are energized, as indicated in the chart of Fig. 4.

It will be observed that in the "trip" position of the rotary drum 14d of the master controller 14f, the contact members j and k of the master controller 14f are connected by the contact element 3 to complete the energizing circuit for the upper winding 41a of the emergency relay 41f and that the contact element 7 on the rotary drum 14d of the master controller 14f connects the associated contact members r and s to complete the energizing circuit, over one or the other of the reverser train wires 31 and 32, to correspondingly energize the lower winding 41b or the upper winding 41a of the emergency relay 41r at the rear end control station, depending upon the position of the master reverser 15f at the front end control station.

Thus in the "trip" position of the rotary drum 14d of the master controller 14f, the emergency relay 41r is picked-up and the contact member a thereof actuated to closed position to connect the positive battery wire 34 at the rear end control station to the emergency wire 44 and thus to establish the holding circuit for energizing the lower winding 41b of the emergency relay 41f at the front end control station.

Accordingly, with the rotary drum 14d of the master controller 14f in "trip" position, the contact member a of the emergency relay 41f is effective to connect the positive battery wire 34 at the front end control station to the contact member i of the master controller 14f to cause energization of the train wires 16, 17, 18 and 19.

With all of the relays 26, 27, 28 and 29 on each car thus energized, a circuit is completed from the positively energized train wire 44 to the trip coil 218 of the master circuit breaker 84 on each car, this circuit extending from the train wire 44 (Fig. 2) by way of the branch wires 175 and 176, all of the contact members 29a, 28a, 27a, 26a of the relays 29, 28, 27 and 26 respectively in their upper positions and in series relation, a wire 391, trip coil 218 of the master circuit-breaker 84, and wire 37 to the negative terminal of the battery 38.

Upon the energization of the trip coil 218, the latch member 216 is withdrawn and, at the same time, the switch member 220 is actuated to open position to interrupt the holding circuit, previously described, for the actuating solenoid 84a of the circuit breaker 84. The armature of the circuit breaker is accordingly actuated by biasing means, not shown, to shift the contact members 84b and 84c to circuit-opening position.

With the contact member 84c in circuit-opening position the supply of current from the battery 38 to the wire 306 is accordingly interrupted. Consequently, upon the restoration of the rotary drum 14d of the master controller 14f to "handle-off" position, when the handle is removed, current will not be supplied to energize the electromagnet windings 77 of the magnetic track brake devices 75. At the same time, the circuit for energizing the dynamic braking relay 72 cannot be completed because the contact member 84c of the circuit breaker is in open position.

Accordingly, while the train is not in service, the brake cylinders remain effective to apply the wheel brakes to a maximum degree, without application of the magnetic track brakes and dynamic brakes.

When the train is again ready for service, and the operator installs the operating handle on the master controller 14f and shifts it to "release-coasting" position, the actuating solenoid 84a is energized in the manner previously described under the control of the contact element 12a on the drum of the brake controller 12, the circuit breaker 84 being latched in closed position and the holding circuit for the solenoid coil 84a set up in the manner previously described.

It will be apparent that with all of the relays 26, 27, 28 and 29 energized none of the contact fingers 151 to 162 of the actuator 13 is connected to the emergency wire 44 so that the operation of the master controller to "trip" position does not cause the actuator pistons 112 to be moved from the position taken thereby in the "emergency" or "handle-off" position of the master controller. Thus the brake controller 12 is not shifted out of its "emergency" position during the operation of the operating handle of the master controller to "trip" position and back to "handle-off" position.

SUMMARY

Summarizing, it will be seen that we have disclosed a multiple unit propulsion and braking control apparatus comprising a propulsion controller and a brake controller on each unit or car operative by a common actuator which is electropneumatically controlled by means of four relays that are operatively connected to and energized from four corresponding train wires.

The equipment is of the double-end type having a master controller and a master reverser at each of the opposite ends of each car or unit, connections between certain of the train wires being established by means of coupler switches so as to render only the master controller and the master reverser at the front end of the first unit and those at the rear end of the last unit operative.

The master controller has a normal position designated "release-coasting" position and the operating handle of the master controller is shiftable in one direction out of the "release-coasting" position to a plurality of propulsion positions to selectively energize the train wires and the connected relays on each car or unit in different combinations for each position so as to effect operation of the actuator and the corresponding operation of the propulsion controller to establish propulsion circuits and to control the rate of acceleration of the train. In a similar manner, the operation of the operating handle of the master controller in the opposite direction to a plurality of different positions from "release-coasting" position selectively energizes the train wires and the corresponding relays connected thereto in different combinations, according to the position selected, to cause the actuator to operate the controller to cause a plurality of different desired degrees of service application and an emergency application of the brakes.

The brake equipment on each car comprises a dynamic brake system employing the car motors as generators, a magnetic track brake system and a fluid pressure brake system, a suppression magnet valve being provided to prevent the supply of fluid under pressure to the brake cylinders of the fluid pressure brake system as long as the braking effect produced by the dynamic brake system exceeds a certain value.

The multiple unit control apparatus includes an emergency relay at each end of a car or unit, the two relays being interlockingly energized through two train wires. The arrangement of these relays is such that unless the emergency relay at the front end control station and the emergency relay at the rear end control station are simultaneously energized by completion of circuits through the two train wires, an emergency application of the brakes is effected on each car or unit. Thus, in the event that the cars of a train part at the couplers in one or more places, the brakes are automatically applied on each of the separate units.

This same circuit arrangement is employed to provide additional protective features, such as a deadman's emergency application or an application of the brakes by devices on each car or unit such as a track switch, a conductor's switch or a low pressure switch responsive to the pressure in the local reservoir on each car.

Another feature of the equipment is the provision of a propulsion prevention relay at the front and rear control stations on each car, one of which, namely that at the control station occupied by the operator, is effective to prevent the supply of propulsion power to the car motors when certain undesired conditions exist on the train, either while stopped or in motion. For example, if all the doors on all the units are not properly closed, the propulsion prevention relay that is effective, prevents propulsion of the train. Similarly, if any of the fluid pressure brake devices are stuck in application position, the relay prevents propulsion of the train. Also, if the speed of the train exceeds a certain maximum speed, as for example on a descending grade, the relay is effective to interrupt the supply of propulsion power to the car motors and thereby to some extent limits the speed of the train.

A self-lapping brake valve operative according to the operation of the brake controller by the actuator on each car or unit controls the supply of fluid under pressure to the brake cylinders of the fluid pressure brake system during service applications of the brakes and enables graduated application of the brakes or application to a desired degree. During an emergency application of the brakes, however, a by-pass magnet valve becomes effective to cause a direct supply of fluid under pressure from the local reservoir on each car to the brake cylinders on each car independently of the self-lapping brake valve. Also during an emergency application the magnetic track brakes are energized to a maximum degree independently of the brake controller.

Each car or unit is provided with a master circuit breaker which controls the supply of current from a local storage battery on each car to the electromagnet winding of the magnetic track brake devices and also the dynamic braking relays. This circuit breaker can be tripped, when desired, by operation of the handle of the master controller at the control station employed by the operator to a "trip" position, the "trip" position being so located as to necessitate the movement of the operating handle through all of the application positions including "emergency" and "handle-off" position. The arrangement is such, therefore, that an emergency application is automatically effected. Restoration of the operating handle of the master controller to "release-coasting" position causes reclosing of the master circuit breaker on each car or unit.

The motor control system includes an overload relay which is automatically opened in the event of excessive propulsion current being supplied to the car motors. A reset switch located at each control station on each car is operable by the operator at the control station occupied, to cause reclosing of the overload relay, the arrangement being such that upon operation of the reset switch, the selectively controlled relays on each car or unit are automatically energized in the proper combination to cause the actuator to shift the propulsion controller to "release-coasting" position, thereby preventing the resupply of propulsion power to the car motors except in the proper manner.

It should be apparent that while we have illustrated the actuator on each car or unit as having only twelve contact fingers associated therewith and have provided only four train wires with four selector relays operating thereon, that any desired number of contact fingers and accordingly any desired number of positions of the actuator may be secured by providing the corresponding number of selector relays and train wires. Thus, for example, by providing five selector relays instead of four it is possible to secure thirty-two combinations thereof so as to enable the employment of a correspondingly greater number of contact fingers on the actuator.

It will also be apparent that while we have shown only one embodiment of our invention, that various omissions, additions or modifications may be made therein without departing from the spirit of our invention. It is accordingly not our intention to limit the scope of our invention except as it is necessitated by the scope of the prior art.

Having now described our invention, what we claim as new and desire to secure by Letters Patent, is:

1. A vehicle control system comprising, in combination, a controller having a plurality of control positions for controlling the motion of the vehicle, a plurality of relays, means for selectively setting up a plurality of different combinations of said relays in which said relays are severally operated or not operated according to the combination selected, and means effective in response and according to the cooperative serial relation of all of said plurality of relays when a selected combination thereof is set up for causing the controller to be moved to a corresponding position and stopped therein.

2. A vehicle control system comprising, in combination, a controller having a plurality of control positions for controlling the motion of the vehicle, a plurality of relays, means for selectively setting up a plurality of different combinations of said relays in which said relays are severally operated or not operated according to the combination selected, and means controlled jointly according to the cooperative serial relation of all of said plurality of relays when a selected combination of the relays is set up and according to the position of the controller for causing the controller to be moved to a position corresponding to the combination of relays set up and stopped therein.

3. A vehicle control system comprising, in combination, a controller having a plurality of control positions for controlling the motion of the vehicle, actuating means for operating the controller to its different control positions, a plurality of relays, means for selectively setting up a plurality of different combinations of said relays in which said relays are severally operated or not operated according to the combination selected, and means effective in response and according to the cooperative serial relation of all of said plurality of relays when a combination thereof is set up for causing the actuating means to operate the controller to a corresponding position and to stop it therein.

4. A vehicle control system comprising, in combination, a controller having a plurality of control positions for controlling the motion of the vehicle, actuating means for operating the controller to its different control positions, a plurality of relays, means for selectively setting up a plurality of different combinations of said relays in which said relays are severally operated or not operated according to the combination selected, and means controlled jointly according to the cooperative serial relation of all of said plurality of relays when a combination thereof is set up and according to the position of the controller for causing the actuating means to operate the controller to a position corresponding to the combination of relays set up and stop it therein.

5. A vehicle control system comprising, in combination, a controller having a plurality of control positions for controlling the motion of the vehicle, a movable abutment responsive to an unbalance of fluid pressure forces acting thereon to move the controller and effective when the fluid pressure forces acting thereon are balanced to hold the controller stationary, a plurality of relays, means for selectively setting up a plurality of different combinations of said relays in which said relays are severally operated or not operated according to the combination selected, and means effective in response and according to the cooperative serial relation of all of said plurality of relays when a combination thereof is set up for automatically controlling the unbalance and balance of fluid pressure forces on said abutment so as to cause it to move the controller to a position coresponding to the combination of relays set up and stop it therein.

6. A vehicle control system comprising, in combination, a controller having a plurality of control positions for controlling the motion of the vehicle, a movable abutment effective in response to an unbalance of fluid pressure forces acting thereon to move the controller and in response to a balance of fluid pressure forces acting thereon to hold the controller stationary, a plurality of relays, means for selectively setting up a plurality of different combinations of said relays in which said relays are severally operated or not operated according to the combination selected, and means controlled jointly according to the cooperative serial relation of all of said plurality of relays when a combination thereof is set up and according to the position of the controller for controlling the unbalance and the balance of fluid pressure forces on the said abutment so as to cause the abutment to move the controller to a position corresponding to the combination of relays set up and stop it therein.

7. A vehicle propulsion control system comprising, in combination, a controller having a plurality of control positions for controlling the propulsion of the vehicle, a plurality of relays, means for selectively setting up a plurality of different combinations of said relays in which said relays are severally operated or not operated according to the combination selected, and means operative in response and according to the cooperative serial relation of all of said plurality of relays when a combination thereof is set up for causing the said controller to be operated to a position corresponding to the combination of relays set up and stopped therein.

8. A vehicle propulsion control system comprising, in combination, a controller having a plurality of control positions for controlling the propulsion of the vehicle, a plurality of relays, means for selectively setting up a plurality of different combinations of said relays in which said relays are severally operated or not operated according to the combination selected, and means controlled jointly according to the cooperative serial relation of all of said plurality of relays when a combination thereof is set up and according to the position of the controller for causing the controller to be moved to a position corresponding to the combination of relays set up and stopped therein.

9. A vehicle brake system comprising, in combination, brake means, a controller having a plurality of different positions for controlling the release and the degree of application of said brake means, a plurality of relays, means for selectively setting up a plurality of different combinations of said relays in which said relays are severally operated or not operated according to the combination selected, and means effective in response and according to the cooperative serial relation of all of said plurality of relays when a combination thereof is set up for causing the controller to be moved to a position corresponding to the combination of relays set up and stopped therein.

10. A vehicle brake system comprising, in combination, brake means, a controller having a plurality of different positions for controlling the release and the degree of application of said brake means, a plurality of electric relays, means for selectively setting up a plurality of different combinations of said relays in which said relays are severally energized or deenergized according to the combination selected, and means controlled jointly according to the coooperative serial relation of all of said plurality of relays when a combination thereof is set up and according to the position of the controller for causing the controller to be moved to a position corresponding to the combination of relays set up and stopped therein.

11. A vehicle control system comprising, in combination, a controller having a plurality of different positions for controlling the motion of the vehicle, fluid pressure operated means for moving the controller to its different control positions, a plurality of electric relays, means for severally energizing or deenergizing said relays in any one of a plurality of different selected combinations, means movable according to the movement of the fluid pressure operated means and carrying two insulated contact segments, a plurality of stationary contact fingers adapted to engage said segments, said relays being cooperatively effective in the different combinations thereof to establish different corresponding circuits to cause energization of only one of said stationary contact fingers corresponding to the selected combination of relays, electromagnetically operated valve means controlled by the engagement and disengagement of an energized contact finger with and from said segments so as to control the balance and unbalance of fluid pressure forces on the fluid pressure operated means to cause it to move the controller to and stop it in a position in which the energized contact finger engages only a certain one of said two movable contact segments.

12. In a control system for a multiple unit vehicle having on one or more of the units a device for changing the motion of the vehicle, in combination, a controller on one or more units having a plurality of positions for controlling the motion-changing device on the corresponding unit, a plurality of relays on one unit or on each of more than one unit respectively, means on one unit of the vehicle for selectively energizing or deenergizing the different relays on each unit at a given time in any one of a plurality of different combinations, and means on one or more units of the vehicle effective in response and according to the cooperative serial relation of all the relays in a selected combination thereof on the corresponding unit for causing movement of the controller on the corresponding unit to a control position corresponding to the selected combination of relays.

13. In a control system for a multiple unit vehicle having on one or more of the units a device for changing the motion of the vehicle, in combination, a controller on one or more units having a plurality of positions for controlling the motion-changing device on the corresponding unit, a plurality of relays on one unit or on each of more than one unit respectively, means on one unit of the vehicle for selectively energizing or deenergizing the plurality of relays on each unit in any one of a plurality of different combinations, and means on one or more units of the vehicle controlled jointly according to the cooperative serial relation of all the relays in a selected combination thereof and the position of the controller on the corresponding unit for causing the controller on the corresponding unit to be operated to a control position corresponding to the selected combination of relays.

14. In a control system for a multiple unit vehicle having on one or more units thereof a plurality of devices for changing the motion of the vehicle, in combination, a controller on one or more units having a plurality of positions for controlling the motion-changing device on the corresponding unit, a plurality of wires extending through all the units, a plurality of electric relays on one or more of the units adapted to be energized according to the energization or deenergization of a corresponding one of said wires, means on one unit for selectively energizing or deenergizing the said wires in a plurality of different combinations to cause the relays on the several units to be correspondingly energized or deenergized in a corresponding number of different combinations, and means on one or more units of the vehicle effective in response to and in accordance with the cooperative serial relation of all the relays in a selected combination thereof for causing the controller on the corresponding unit to be operated to a control position corresponding to the selected combination of relays.

15. In a control system for a multiple unit vehicle having on one or more units thereof a plurality of devices for changing the motion of the vehicle, in combination, a controller on one or more units having a plurality of positions for controlling the motion-changing device on the corresponding unit, a plurality of wires extending through all the units, a plurality of electric relays on one or more of the units adapted to be energized according to the energization or deenergization of a corresponding one of said wires, means on one unit for selectively energizing or deenergizing the said wires in a plurality of different combinations to cause the relays on the several units to be correspondingly energized or deenergized in a corresponding number of different combinations, and means on one or more units of the vehicle controlled jointly according to the cooperative serial relation of all the relays in a selected combination thereof and according to the position of the controller for causing the controller on the corresponding unit to be operated to a control position corresponding to the selected combination of relays.

16. A vehicle braking and propulsion control system comprising, in combination, a controller having a plurality of different positions for controlling the propulsion of the vehicle, a controller having a plurality of different positions for controlling the braking of the vehicle, a plurality of relays, means adapted to energize or deenergize the relays in any one of a plurality of different selected combinations, and means effective in accordance with the combination of relays selected to cause movement of either of said controllers to a control position corresponding to the selected combination of relays.

17. In a braking and propulsion control system for a multiple unit vehicle having on one or more units thereof a plurality of separate brake means and a plurality of separate propulsion means, in combination, a controller on one or more units having a plurality of different positions for controlling the propulsion means on the corresponding unit, a controller on one or more units having a plurality of different positions for controlling the brakes on the corresponding unit, a plurality of relays on one unit or on each of more than one unit, means on one unit adapted to energize or deenergize the relays on the several units uniformly in any one of a plurality of different selected combinations, and means effective in accordance with the selected combination of relays for causing operation of either of said controllers to a control position corresponding to the selected combination of relays.

18. In a vehicle brake and propulsion system for a multiple unit vehicle having separate brake means and propulsion means on each unit thereof, in combination, a controller on each unit of the vehicle for controlling the propulsion means on the corresponding unit, a controller on each unit for controlling the braking on the corresponding unit, a plurality of wires extending through all units of the vehicle, a plurality of relays on each unit of the vehicle adapted to operate on the different wires respectively, means on one unit of the vehicle for energizing and deenergizing the said wires and correspondingly the different relays on the several units of the vehicle in any one of a plurality of different selected combinations, fluid pressure operated means for moving either of said controllers to any one of a plurality of different control positions thereof, and electroresponsive valve means controlled jointly according to the selected combination of relays and according to the position of the fluid pressure operated means for automatically controlling the balance and unbalance of fluid pressure forces on the fluid pressure operated means to cause it to move either of said controllers to a control position corresponding to the selected combination of relays.

19. An actuator device comprising a casing, a pair of connected pistons operative reciprocatingly within said casing and subject at all times on the inner faces thereof to atmospheric pressure, a magnet valve device having a single electromagnet winding effective when deenergized to cause fluid under pressure to be supplied to the outer face of one of said pistons and effective when energized to cause fluid under pressure to be released from the outer face of said piston, a second magnet valve device having two separate electro-magnet windings each effective to operate the valve device when energized to cause fluid under pressure to be supplied to the outer face of the other of said pistons and when both are deenergized to cause fluid under pressure to be released therefrom, a plurality of stationary contact members not more than one of which is selectively energized at any one time, means movable with the pistons and having thereon in insulated relation a pair of contact members cooperatively associated with said stationary contact members, the arrangement of the stationary contact members and the movable contact members being such that, unless a certain one of said movable contact member engages that one stationary contact member which is energized, the electromagnet windings of the said magnet valve devices are so energized or deenergized as to cause an unbalance of fluid pressure forces on the pistons effective to move the pistons in a direction to effect engagement of said certain one of the movable contact members with the one stationary contact member that is energized, in which position the electromagnet windings of the magnet valve devices are so energized or deenergized as to cause a balance of fluid pressure forces on the said pistons and the consequent stopping of the pistons in such positions.

20. In combination, a casing, a pair of connected pistons operative in said casing and subject at all times to atmospheric pressure on the inner faces thereof, a plurality of electroresponsive valve means for controlling the supply and the release of fluid under pressure to and from the outer faces of said piston, a plurality of stationary contact members arranged in spaced relation, means for selectively energizing only one of said stationary contact members at a given time, means movable according to the movement of the pistons and having thereon in insulated relation a plurality of contact members adapted to be cooperatively associated with said stationary contact members, the stationary contact members and the contact members on said movable means cooperating to so control said electroresponsive means as to cause an unbalance of fluid pressure forces on the said pistons resulting in movement of the pistons toward and into a position in which one of said movable contact members engages the one selectively energized stationary contact member, and to cause a balance of fluid pressure forces on the pistons in such position so that the pistons remain stationary in such position.

21. A vehicle brake system comprising, in combination, a controller having a plurality of brake control positions including an emergency application position, actuating means for operating the controller to any of the brake control positions, means under the control of the operator for causing the actuating means to operate the controller to a selected position, a pair of normally closed circuits, means effective upon interruption of either of said circuits for effecting interruption of both said circuits, and means effective in response to the interruption of one of said circuits for causing the actuating means to operate the controller to its emergency application position independently of the operator-controlled means.

22. In a brake equipment for a multiple unit vehicle having on one or more units thereof a plurality of separate brake means, in combination, a controller on one or more units for controlling the brakes on the corresponding unit, actuating means on one or more units for operating the controller on the corresponding unit to any one of a plurality of different brake control positions including an emergency application position, a master controller on one unit operative to so control the actuating means on the several units as to effect operation of the controllers in synchronism and as to position them uniformly, a pair of wires extending through all units of the vehicle, two normally closed circuits one of which includes one of said wires and the other of which includes the other of said wires, means effective upon interruption of either of said circuits for effecting interruption of both of said circuits, and means on one or more of said units effective in response to the interruption of one of said circuits for causing the actuating means on the corresponding unit to operate the controller on the corresponding unit to its emergency application position independently of the master controller.

23. In a brake system for a multiple unit vehicle having a plurality of separate brake means on one or more units, in combination, a master brake controller on one unit having a plurality of brake control positions including a release position and an emergency application position, a local controller on one or more units having a plurality of brake control positions including a release position and an emergency application position for controlling the brakes of the corresponding unit, actuating means on one or more units operative under the control of said master controller to position the local controller on the corresponding unit according to the position of the master controller, a pair of wires extending through all units of the vehicle, a pair of normally closed circuits, one circuit including one of said wires and the other circuit includng the other of said wires, means for deenergizing both of said circuits when the master controller is in its emergency application position and for energizing said circuits when the master controller is in release position and other brake control positions, means on one or more units for interrupting the circuit including one of said wires, means effective in response to interruption of either of said circuits for effecting deenergization of both said circuits, and means responsive to the deenergization of one of said circuits for causing the actuating means on the several units to operate the local controller on the corresponding unit to its emergency application position.

24. In a brake system for a multiple unit vehicle having brake equipment on one or more units, in combination, a local controller on one or more units of the vehicle for controlling the brakes on the corresponding unit, a pair of wires extending through all units of the vehicle, means normally effective to cause energization of both of said wires and effective upon the interruption of either of said wires to cause deenergization of both of said wires, electroresponsive means on one or more units of the vehicle for effecting the operation of the controller on the corresponding unit to different brake control positions, a master controller on one unit of the vehicle having a plurality of brake control positions, electric relays on one or more units of the vehicle effective under the control of the master controller for controlling the supply of current from a certain one of said wires, while energized, to said electroresponsive means whereby the electroresponsive means is effective to operate the controller on the corresponding unit to a position corresponding to that of the master controller, said electroresponsive means being effective to operate the controller on the corresponding unit to a position for effecting an emergency application of the brakes upon deenergization of said certain one of said wires independently of the position of the master controller.

25. In a vehicle brake system for a multiple unit vehicle having brake means on each unit, in combination, a controller on each unit having a plurality of brake control positions including an emergency application position for controlling the brakes on the corresponding unit, actuating means on each unit for operating the corresponding controller to its different brake control positions, a master controller on one unit of the vehicle effective to cause operation of the actuating means on each unit so as to move the controllers on the several units synchronously and position them uniformly in any of the brake control positions, a pair of wires extending through all units of the vehicle, a pair of relays one of which is located at the front end control station on the first unit of the vehicle and the other of which is located at the rear end control station of the last unit of the vehicle, each of said relays having two separate electromagnet windings and each winding being effective when energized to cause the relay to be picked up, said master controller being effective to cause energization of one winding of the relay at the front end control station, said relay at the front end control station being effective when picked up to establish a circuit including one of said wires to cause energization of one of the windings of the relay at the rear end of the control station, said relay at the rear end control station being effective when picked up to establish a circuit including the other of said wires to cause energization of the other winding of said relay at the front end control station, said actuating means being effective upon the deenergization of one of said wires to cause operation of the controller on the corresponding unit to emergency application position, independently of the position of the master controller.

26. In a vehicle braking and propulsion sysstem for a multiple unit vehicle having brake means and propulsion means on one or more units, in combination, local control means on one or more units for controlling the propulsion means on the corresponding unit and the brakes on the corresponding unit, operating means for said control means on each unit, a master controller on one unit of the vehicle for controlling the operating means on the different units to cause operation of the control means on the different units in synchronism and uniform positioning thereof, a pair of wires extending through all units of the vehicle, means effective in a propulsion position of the master controller for effecting energization of both said wires and effective upon interruption of either of said wires to cause deenergization of both said wires, the operating means on the different units of the vehicle being effective in response to the deenergization of either of said wires to cause operation of the control means on the different units to cut off the supply of power to the propulsion means and to cause an emergency application of the brakes on the different units.

27. A vehicle propulsion control system comprising, in combination, a controller having a certain position in which the supply of power to the propulsion means on the vehicle is interrupted and a plurality of other positions in which power is supplied to the propulsion means of the vehicle, actuating means for operating the said controller to the different control positions, a master controller under the control of the operator having a plurality of positions corresponding to the positions of the said controller, means effective when the master controller is in any one of its positions to cause the actuating means to operate the controller to a corresponding control position, a normally closed circuit, means for interrupting said circuit unless a door on the vehicle is closed, and electroresponsive means controlled by said circuit for so controlling the actuating means as to cause it to maintain the said controller in the said certain position thereof while said circuit is interrupted notwithstanding operation of the master controller to a power supply position.

28. A vehicle propulsion control system comprising, in combination, a controller having a certain position in which the supply of power to the propulsion means on the vehicle is interrupted and a plurality of other positions in which power is supplied to the propulsion means of the vehicle, actuating means for operating the said controller to the different control positions, a master controller under the control of the operator having a plurality of positions corresponding to the positions of the said controller, means effective when the master controller is in any one of its positions to cause the actuating means to operate the controller to a corresponding control position, a normally closed circuit, means for interrupting said circuit unless the brakes on the vehicle are released, and means controlled by said circuit effective, while the circuit is interrupted, to prevent the actuating means from operating the said controller out of its said certain position.

29. A vehicle propulsion control system comprising, in combination, a controller having a certain position in which the supply of power to the propulsion means on the vehicle is interrupted and a plurality of other positions in which power is supplied to the propulsion means of the vehicle, actuating means for operating the said controller to the different control positions, a master controller under the control of the operator having a plurality of positions corresponding to the positions of the said controller, means effective when the master controller is in any one of its positions to cause the actuating means to operate the controller to a corresponding control position, a normally closed circuit, means effective when the said circuit is interrupted for causing the said actuating means to operate the said controller to its said certain position in which the supply of power to the propulsion means is interrupted while the master controller is in any of its control positions, and means for interrupting said circuit when the speed of the vehicle exceeds a certain speed.

30. A propulsion control system for a multiple unit vehicle having separate propulsion means on each unit, a controller on each unit effective in a certain position thereof to prevent the supply of propulsion power to the propulsion means on the corresponding unit and having a plurality of other positions in which propulsion power is supplied to the propulsion means, actuating means on each unit for operating the corresponding controller to the different control positions, a master controller on one unit of the vehicle under the control of the operator having a plurality of control positions corresponding to the positions of the controller on each unit, a plurality of relays on each unit adapted to be selectively energized and deenergized in different combinations corresponding to the different control positions of the master controller, means on each unit controlled according to the selected combination of relays for causing the actuating means to operate the controller on the corresponding unit to a position corresponding to the selected combination of relays, a normally closed circuit including a wire extending through all units of the vehicle, and means controlled by and effective upon interruption of said circuit for automatically selecting a certain combination of relays on each unit while the master controller is in any propulsion control position thereof to cause the actuating means to operate the controller on the corresponding unit to its said certain position in which the supply of power to the propulsion means is interrupted.

31. A propulsion control system for a multiple unit vehicle having separate propulsion means on each unit, a controller on each unit effective in a certain position thereof to prevent the supply of propulsion power to the propulsion means on the corresponding unit and having a plurality of other positions in which propulsion power is supplied to the propulsion means, actuating means on each unit for operating the corresponding controller to the different control positions, a master controller on one unit of the vehicle under the control of the operator having a plurality of control positions corresponding to the positions of the controller on each unit, a plurality of relays on each unit adapted to be selectively energized and deenergized in different combinations corresponding to the different control positions of the master controller, means on each unit controlled according to the selected combination of relays for causing the actuating means to operate the controller on the corresponding unit to a position corresponding to the selected combination of relays, a normally closed circuit including a wire extending through all units of the vehicle, and means effective while said circuit is interrupted for automatically maintaining a selected combination of the relays on each unit so as to cause the actuating means to maintain the controller on the corresponding unit in its said certain position notwithstanding the operation of the master controller to a propulsion control position.

32. A propulsion control system for a multiple unit vehicle having separate propulsion means on each unit, a controller on each unit effective in a certain position thereof to prevent the supply of propulsion power to the propulsion means on the corresponding unit and having a plurality of other positions in which propulsion power is supplied to the propulsion means, actuating means on each unit for operating the corresponding controller to the different control positions, a master controller on one unit of the vehicle under the control of the operator having a plurality of control positions corresponding to the positions of the controller on each unit, a plurality of relays on each unit adapted to be selectively energized and deenergized in different combinations corresponding to the different control positions of the master controller, means on each unit controlled according to the selected combination of relays for causing the actuating means to operate the controller on the corresponding unit to a position corresponding to the selected combination of relays, a normally closed circuit including a wire extending through all units of the vehicle, means effective while said circuit is interrupted for automatically maintaining a selected combination of the relays on each unit so as to cause the actuating means to maintain the controller on the corresponding unit in its said certain position notwithstanding the operation of the master controller to a propulsion control position, and means for interrupting said circuit while a door on any of the units is open.

33. A propulsion control system for a multiple unit vehicle having separate propulsion means on each unit, a controller on each unit effective in a certain position thereof to prevent the supply of propulsion power to the propulsion means on the corresponding unit and having a plurality of other positions in which propulsion power is supplied to the propulsion means, actuating means on each unit for operating the corresponding controller to the different control positions, a master controller on one unit of the vehicle under the control of the operator having a plurality of control positions corresponding to the positions of the controller on each unit, a plurality of relays on each unit adapted to be selectively energized and deenergized in different combinations corresponding to the different control positions of the master controller, means on each unit controlled according to the selected combination of relays for causing the actuating means to operate the controller on the corresponding unit to a position corresponding to the selected combination of relays, a normally closed circuit including a wire extending through all units of the vehicle, means effective while said circuit is interrupted for automatically maintaining a selected combination of the relays on each unit so as to cause the actuating means to maintain the controller on the corresponding unit in its said certain position notwithstanding the operation of the master controller to a propulsion control position, and means for interrupting said circuit as long as the brakes on any of the units remain unreleased.

34. A propulsion control system for a multiple unit vehicle having separate propulsion means on each unit, a controller on each unit effective in a certain position thereof to prevent the supply of propulsion power to the propulsion means on the corresponding unit and having a plurality of other positions in which propulsion power is supplied to the propulsion means, actuating means on each unit for operating the corresponding controller to the different control positions, a master controller on one unit of the vehicle under the control of the operator having a plurality of control positions corresponding to the positions of the controller on each unit, a plurality of relays on each unit adapted to be selectively energized and deenergized in different combinations corresponding to the different control positions of the master controller, means on each unit controlled according to the selected combination of relays for causing the actuating means to operate the controller on the corresponding unit to a position corresponding to the selected combination of relays, a normally closed circuit including a wire extending through all units of the vehicle, means controlled by and effective upon interruption of said circuit for automatically selecting a certain combination of relays on each unit while the master controller is any propulsion control position thereof to cause the actuating means to operate the controller on the corresponding unit to its said certain position in which the supply of power to the propulsion means is interrupted, and means for interrupting said circuit when the speed of said vehicle exceeds a certain speed.

35. A propulsion control system for a vehicle having a propulsion motor, a controller having a plurality of positions, in one of which the supply of propulsion current to the motor is interrupted and in others of which propulsion current is supplied to the motor, actuating means for operating the controller to its different positions, a manually operable controller having positions corresponding to those of the said controller, means effective in the different positions of the manually operable controller to cause the actuating means to operate the said controller to control positions corresponding to those of the manually operable controller, an overload relay effective to interrupt the supply of propulsion current to the said motor when such current exceeds a certain value, said overload relay being adapted to be locked in supply prevention position and having a reset means effective upon operation to cause the overload relay to be reset in position to permit the supply of current to the propulsion motor, a reset device operative to cause the reset means of the overload relay to be operated to reset the overload relay, and means operative upon operation of the reset means to reset the overload relay for causing the actuating means to operate the controller to a position for interrupting the supply of propulsion current to the said motor.

36. A propulsion control system for a vehicle having a propulsion motor comprising in combination, a controller effective in a certain position thereof to prevent the supply of propulsion current to the motor and operative to a plurality of other positions to cause propulsion current to be supplied to said motor, an actuating means for operating the said controller to the different control positions, a plurality of relays, a master controller having a plurality of positions corresponding to the control positions of the controller and effective in the different positions thereof respectively to selectively energize and deenergize the said relays in different corresponding combinations, means controlled according to the combination of relays selected for causing the actuating means to operate the said controller to a control position corresponding to the control position of the master controller, an overload relay adapted to interrupt the supply of current to the said motor when said current exceeds a certain value and including means for maintaining the overload relay in interrupting position and means for resetting said relay, a manually operative device operative to select a particular combination of the relays in which the reset means of the overload relay is operated to reset the relay and the actuating means is caused to operate the controller to a position interrupting the supply of current to the said motor independently of the control position of the master controller.

37. A brake control system for a vehicle having electric brake means, in combination, a master controller having a plurality of different brake control positions including release, emergency and trip positions, a local controller having a plurality of different brake control positions including release and emergency positions for controlling the brakes on the vehicle, a plurality of relays adapted to be energized and deenergized in any one of a plurality of different selected combinations according to the position of the master controller, means effective in accordance with the combination of said relays corresponding to emergency position of the master controller for effecting operation of the local controller to cause emergency application of the brakes on the vehicle, a source of electric current, a circuit breaker adapted when in closed position to permit the supply of current from said source to the electric brake means and when in tripped position to prevent such supply, said relays being effective in the combination thereof corresponding to the trip position of the master controller to cause operation of the said local controller to emergency application position and operation of the said circuit breaker to tripped position.

38. A vehicle control system comprising in combination, a first means operative to perform a certain control function, a second means operative to perform a certain different control function, a plurality of relays, and means for severally energizing or deenergizing said relays in any one of a plurality of different selected combinations, said relays being effective for a certain selected combination thereof to cause operation of only said first means and effective for a certain different selected combination of said relays to cause operation of both said first and said second means.

39. An actuator device comprising a casing, movable abutment means within said casing, electroresponsive valve means for controlling the balance and unbalance of fluid pressure forces on said movable abutment means to cause the stopping and movement of said abutment respectively, a plurality of progressively arranged spaced stationary contact members only one of which is selectively energized at one time, means movable with the movable abutment means and having thereon a pair of contact members that cooperate with the stationary contact members for automatically controlling the electroresponsive means so as to cause movement of said abutment means selectively in opposite directions depending upon the position of the energized stationary contact member relative to the said pair of movable contact members and the stopping of said abutment means in a position in which only a certain one of the two movable contact members engages the one of the stationary contact members that is energized.

40. An actuator device comprising a casing, movable abutment means within said casing, electroresponsive valve means for controlling the balance and unbalance of fluid pressure forces on said abutment means so as to effect the stopping and the movement thereof respectively, a plurality of progressively arranged spaced stationary contact members only one of which is selectively energized at one time, means movable with the movable abutment means and having thereon only two contact members, one of which is relatively short and the other of which is relatively long, which contact members are adapted to cooperatively engage the stationary contact members in a manner to automatically control the electroresponsive means so that it causes movement of said abutment means selectively in opposite directions depending upon the position of the energized stationary contact member relative to said movable contact members and the stopping of said abutment means in a position in which the relatively short movable contact member engages the one of the stationary contact members that is energized.

41. A vehicle braking and propulsion control system comprising in combination, a controller having a plurality of different positions for controlling the propulsion of the vehicle, a controller having a plurality of different positions for controlling the release and the degree of application of the brakes on the vehicle, a plurality of electric relays, manually operative means having a plurality of different propulsion control positions and a plurality of different brake control positions and effective in the different positions thereof to selectively set up different combinations of said relays in which said relays are severally energized or deenergized according to the combination corresponding to the position of the manually operated means, and means operative in response and according to the combination of relays set up for causing movement of either of said controllers to a control position corresponding to the position of the manually operative means.

42. A vehicle braking and propulsion control system comprising, in combination, a controller having a plurality of different positions for controlling the propulsion of the vehicle, a controller having a plurality of different positions for controlling the release and the degree of application of the brakes on the vehicle, a plurality of electric relays, manually operative means having a plurality of different propulsion control positions and a plurality of different brake control positions and effective in the different positions thereof to selectively set up different combinations of said relays in which said relays are severally energized or deenergized according to the combination corresponding to the position of the manually operated means, means operative in response and according to the combination of relays set up for causing movement of either of said controllers to a control position corresponding to the position of the manually operative means, a normally closed circuit, and means operating on said circuit and effective upon interruption of the circuit while the manually operative means is in any propulsion control position to set up a certain combination of said relays, independently of the manually operative means, so as to cause operation of the propulsion controller to its power-off position.

43. A vehicle braking and propulsion control system comprising, in combination, a controller having a plurality of different positions for controlling the propulsion of the vehicle, a controller having a plurality of different positions for controlling the release and the degree of application of the brakes on the vehicle, a plurality of electric relays, manually operative means having a plurality of different propulsion control positions and a plurality of different brake control positions and effective in the different positions thereof to selectively set up different combinations of said relays in which said relays are severally energized or deenergized according to the combination corresponding to the position of the manually operated means, means operative in response and according to the combination of relays set up for causing movement of either of said controllers to a control position corresponding to the position of the manually operative means, a normally closed circuit, and means operating on said circuit and effective, while said circuit is interrupted, to maintain a certain combination of said relays set up in which the propulsion controller occupies a power-off position and to prevent variation of said certain combination of the relays notwithstanding operation of the manually operative means to a propulsion position.

44. A vehicle braking and propulsion control system comprising, in combination, a controller having a plurality of different positions for controlling the propulsion of the vehicle, a controller having a plurality of different positions for controlling the release and the degree of application of the brakes on the vehicle, a plurality of electric relays, manually operative means having a plurality of different propulsion control positions and a plurality of different brake control positions and effective in the different positions thereof to selectively set up different combinations of said relays in which said relays are severally energized or deenergized according to the combination corresponding to the position of the manually operated means, means operative in response and according to the combination of relays set up for causing movement of either of said controllers to a control position corresponding to the position of the manually operative means, a normally closed circuit, and means operating on said circuit and effective, while said circuit is interrupted, to maintain a certain combination of said relays set up in which the propulsion controller occupies a power-off position and to prevent variation of said certain combination of the relays notwithstanding operation of the manually operative means to a propulsion position, said last means being ineffective to prevent variation of the said certain combination of relays by operation of the manually operative means to a brake application position.

FRANK H. NICHOLSON.
JOHN W. LOGAN, JR.